US007109462B2

(12) United States Patent
Tateishi et al.

(10) Patent No.: US 7,109,462 B2
(45) Date of Patent: Sep. 19, 2006

(54) LIGHT BEAM OUTPUT CONTROL APPARATUS, OPTICAL PICKUP APPARATUS, LIGHT BEAM EMISSION CONTROL METHOD AND COMPUTER-READABLE RECORDED MEDIUM IN WHICH LIGHT BEAM EMISSION CONTROL PROGRAM IS RECORDED

(75) Inventors: Kiyoshi Tateishi, Tsurugashima (JP); Junichi Furukawa, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 259 days.

(21) Appl. No.: 10/753,533

(22) Filed: Jan. 9, 2004

(65) Prior Publication Data

US 2004/0144909 A1 Jul. 29, 2004

(30) Foreign Application Priority Data

Jan. 10, 2003 (JP) ............................ P2003-004827

(51) Int. Cl.
*G01J 1/32* (2006.01)
*G02B 7/043* (2006.01)
*G11B 7/00* (2006.01)

(52) U.S. Cl. .................. 250/205; 369/116; 369/122; 369/124.2; 250/201.5

(58) Field of Classification Search ............... 250/205, 250/201.5; 369/47, 47.51, 47.53, 53.44, 369/116
See application file for complete search history.

(56) References Cited

U.S. PATENT DOCUMENTS 5,126,994 A * 6/1992 Ogawa et al. ............... 369/116

| 5,956,313 | A | 9/1999 | Maegawa et al. |
| 6,147,957 | A * | 11/2000 | Nagara et al. .......... 369/59.11 |
| 2002/0018419 | A1 | 2/2002 | Watabe |
| 2004/0079864 | A1* | 4/2004 | Suzuki ..................... 250/205 |

FOREIGN PATENT DOCUMENTS

| EP | 1 207 525 A2 | 5/2002 |
| EP | 1 258 956 A2 | 11/2002 |
| EP | 1 213 713 A1 | 12/2002 |
| EP | 1 437 718 A2 | 7/2004 |
| JP | 11-339398 | 12/1999 |
| WO | WO 02/097804 A1 | 12/2002 |
| WO | WO 03/001519 A1 | 1/2003 |

* cited by examiner

Primary Examiner—Georgia Epps
Assistant Examiner—Don Williams
(74) Attorney, Agent, or Firm—Drinker Biddle & Reath LLP

(57) ABSTRACT

An optical pickup apparatus comprises a semiconductor laser output controller for emitting laser beam, a photodetector for detecting the emitted laser beam, a sampling processor for performing a sampling process, an averaging processor for performing an averaging process, a pulse current generator for generating erase current pulses, write current pulses, and read current pulses, and a controller 200 for controlling the above components. The apparatus adds averaged values and sampled values and controls the semiconductor laser output controller based on the result of the addition and on the current pulses.

16 Claims, 15 Drawing Sheets

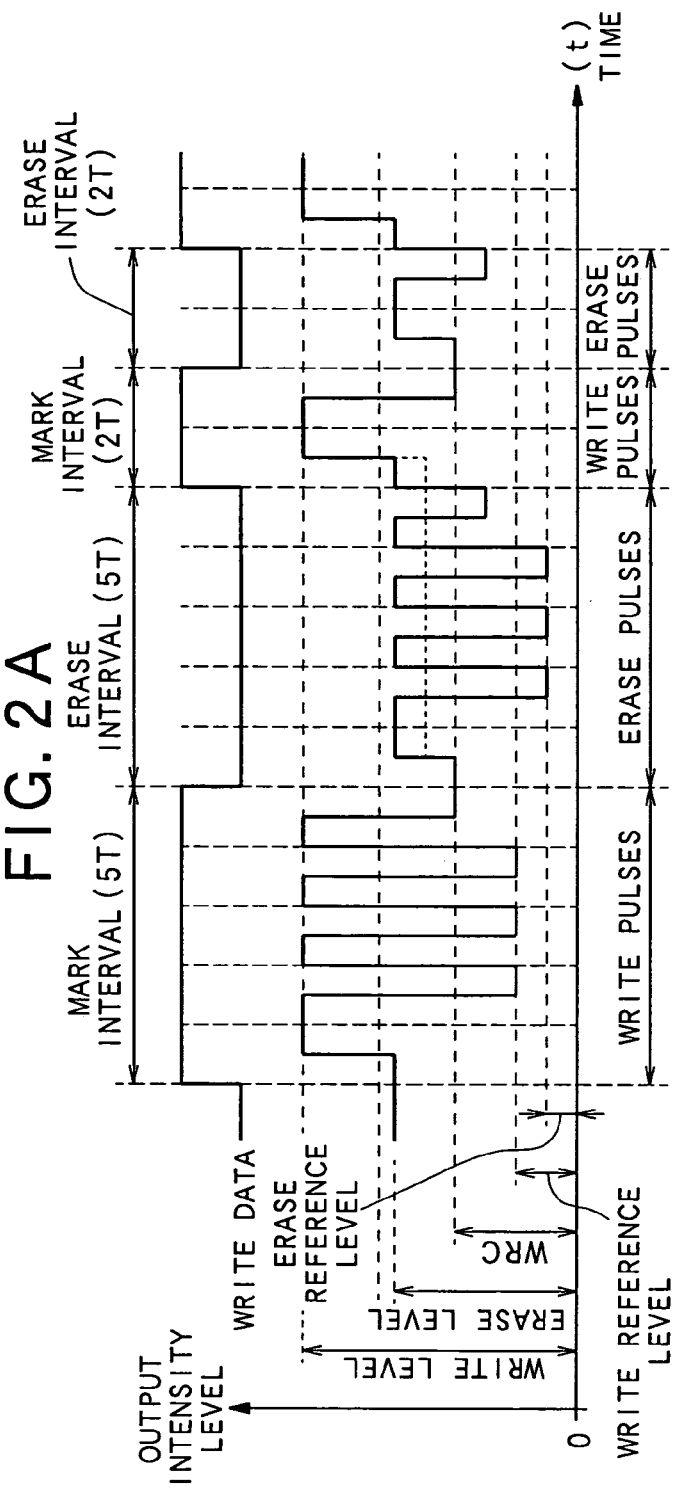
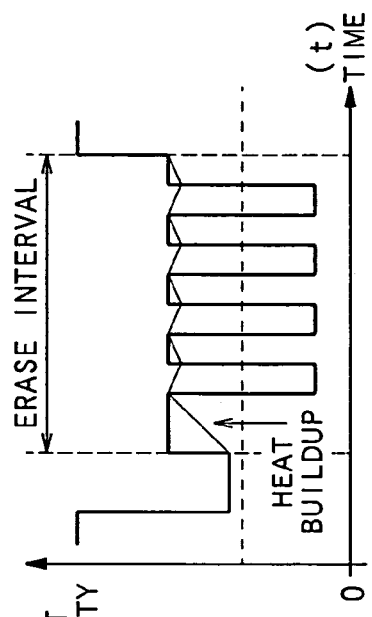
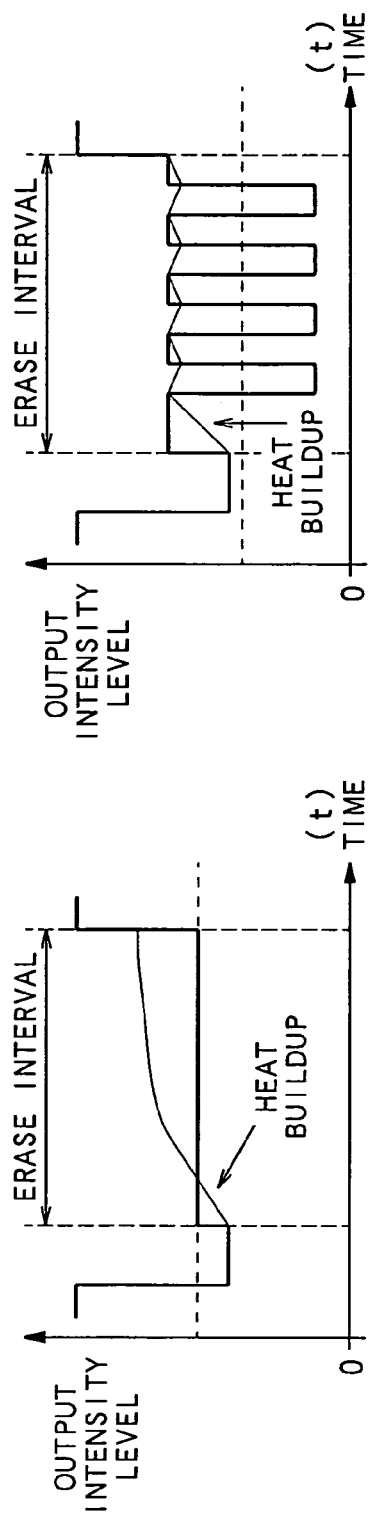

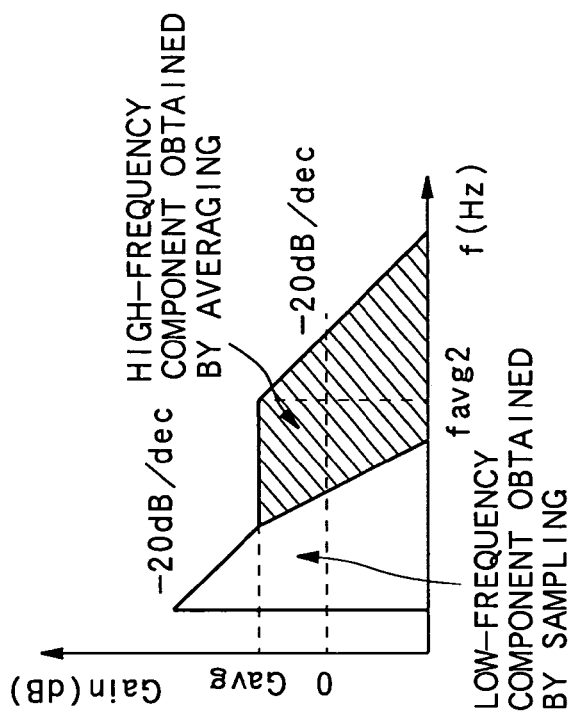
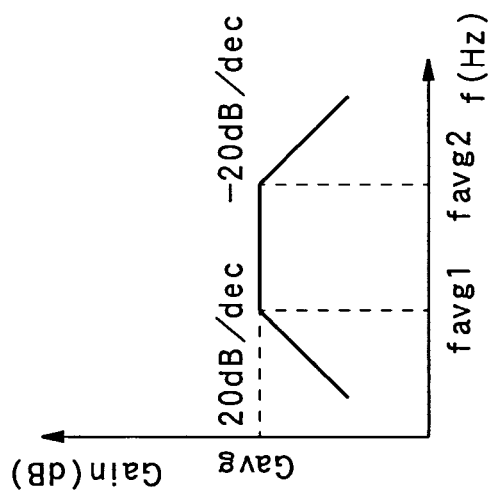
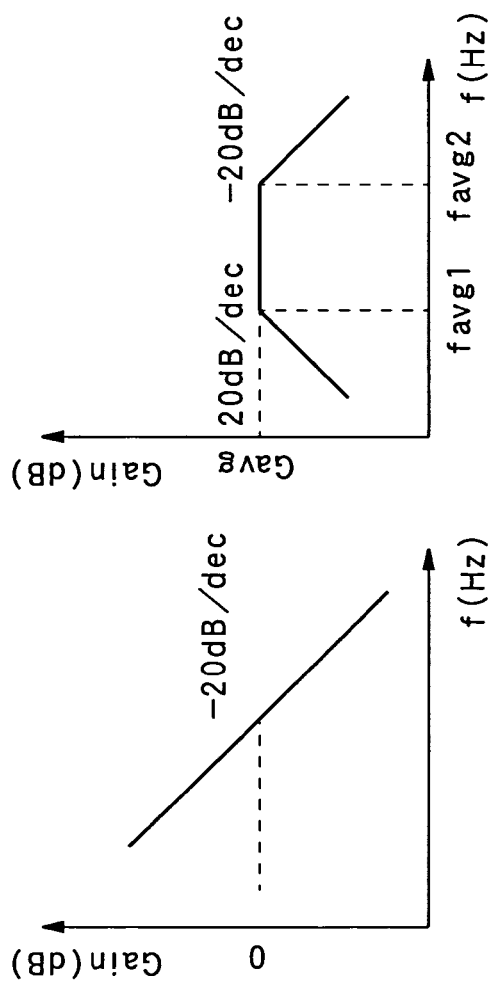

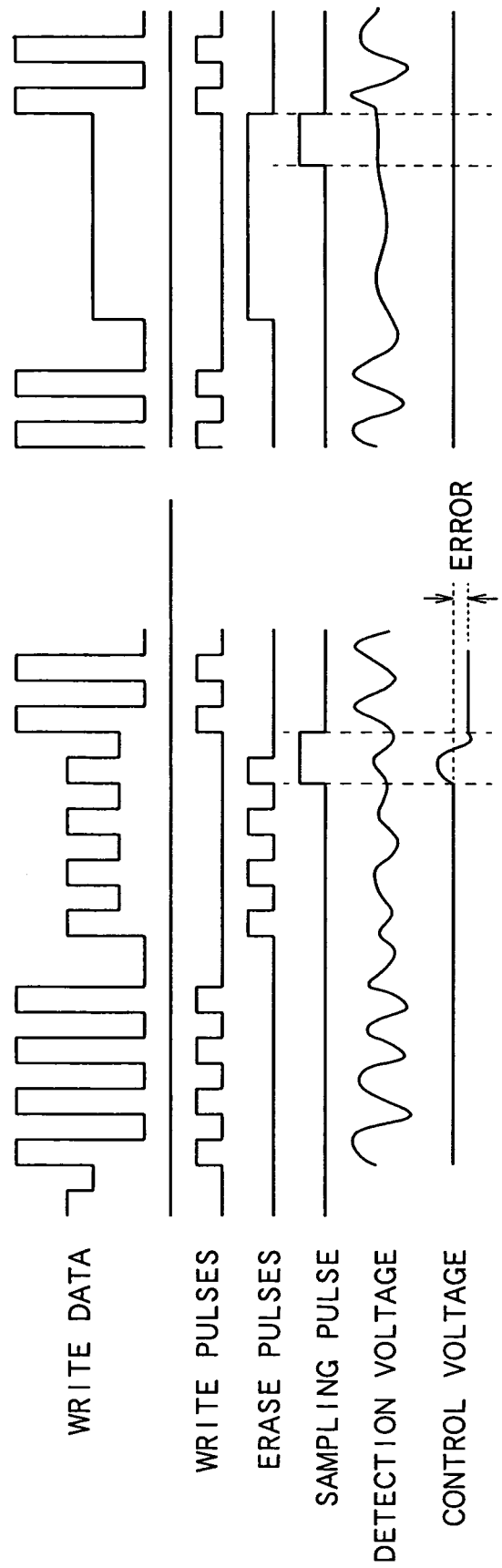

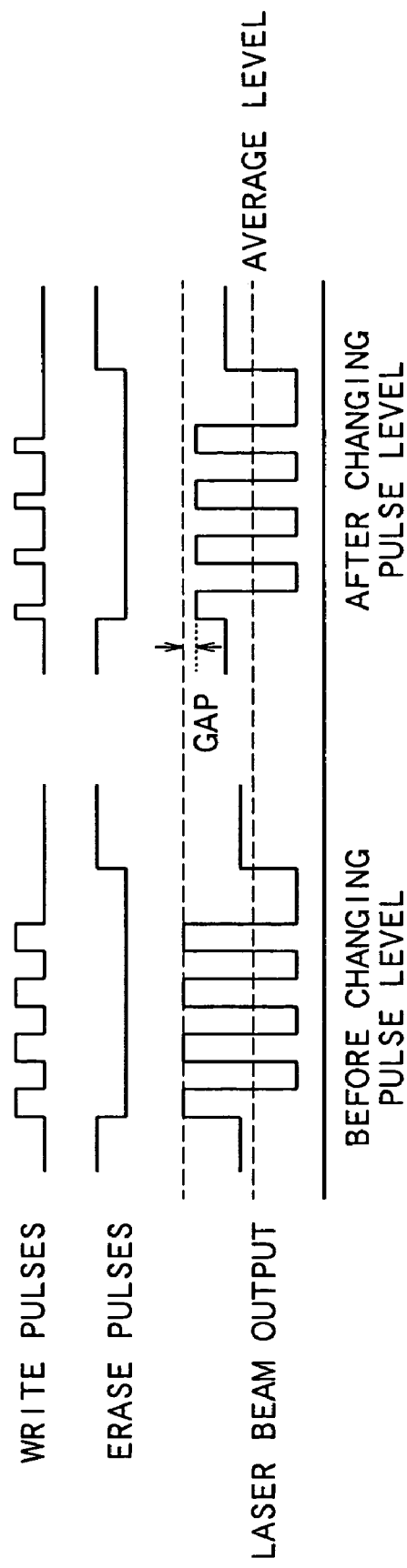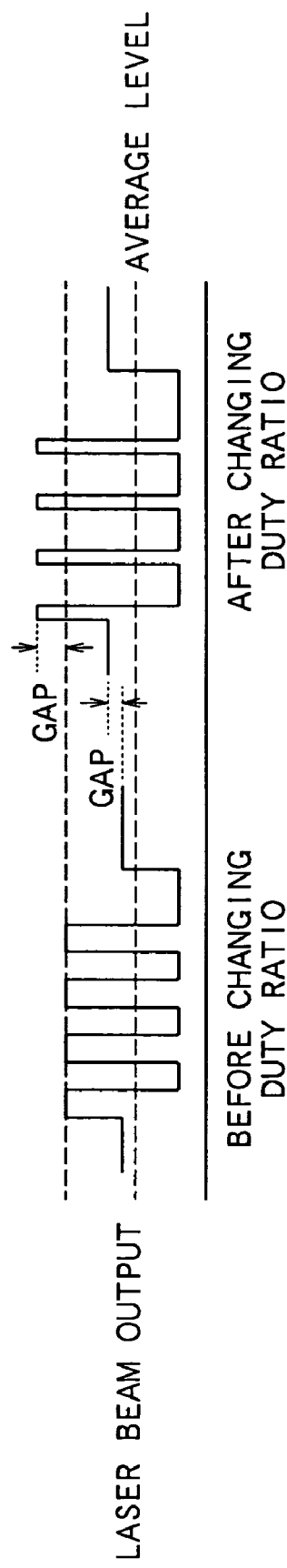

LIGHT BEAM OUTPUT CONTROL APPARATUS, OPTICAL PICKUP APPARATUS, LIGHT BEAM EMISSION CONTROL METHOD AND COMPUTER-READABLE RECORDED MEDIUM IN WHICH LIGHT BEAM EMISSION CONTROL PROGRAM IS RECORDED

BACKGROUND OF THE INVENTION

1. Field of the Invention

This invention relates to the technical field of a laser output control unit, which controls output of a light beam such as a semiconductor laser.

2. Description of the Related Art

In recent years, as CDs (Compact Discs) and DVDs (Digital versatile Discs) have spread widely, and a recording and reproducing device used to reproduce information recorded on those optical recording medium have been developed. Then, there is a demand for technology for recording data stably on the optical recording medium and technology for reproducing data recorded on the recording medium stably.

In particular, semiconductor leaser used to record and reproduce data on optical on optical disc drive is also used as light source in other technical field such as technical field of optical communications systems and image forming apparatus. In using semiconductor laser, these apparatus are generally equipped with a laser output control unit to control laser output appropriately.

One of typical control methods for the laser output control unit is an average APC (Automatic Power Control) method that performs negative feedback control of laser output based on as average value of the laser output.

For example, according to average APC method, in a case of controlling the output of laser beam to record data on a DVD disc and reproduce data recorded on the DVD disc, the laser beam emitted from a semiconductor laser based on write data to be written on the DVD disc is detected by a monitoring photodetector. Then, average value of light beam intensities is calculated over a certain period of time based on the light beam intensity of the detected laser beam, and negative feedback control is performed with respect to output level of the laser beam emitted to the DVD disc based on the calculated average value of light beam intensities and a preset target light beam intensity of laser beam (see for example, Japanese Laid-Open Patent Application No. H 11-339398).

However, in the case of performing negative feedback control as the described above, the conventional average APC method is not capable of independently setting intensity levels and irradiation times of different laser beam. In other words, the conventional average APC method is not capable of maintaining independence of individual intensity levels.

SUMMARY OF THE INVENTION

Taking the aforementioned point into consideration, the object of this invention is to provide a laser beam output control apparatus and an optical pickup apparatus are capable of changing intensity levels and irradiation times of the beam outputted from a semiconductor easily and independently when the intensity levels of the laser beam outputted from the semiconductor laser are modulated.

The above object of present invention can be achieved by a light beam output control apparatus of the present invention. The light beam output control apparatus is provided with: an emission device which emits a light beam; a detection device which detects at least part of the light beam emitted from the emission device; an acquisition device which acquires, as a sampling value, the light intensity level of the detected light beam emitted with a predetermined timing; a first storage device which prestores a value made into a target at a average value at the intensity level of the detected light beam as a target average value; a second storage device which stores a sampling value made into a target at the intensity level of the light beam acquired as the sampling value, as a target sampling value; a first error calculation device which calculates average error between the average value at the intensity level of the detected light beam and the target average value based on the light intensity level of the detected light beam and the stored target average value; a second error calculation device which calculates sampling error between the stored target sampling value and the acquired sampling value; and a control device which controls the output intensity level of the light beam emitted from the emission device, based on the calculated average error and the calculated sampling error.

According to the present invention, the output intensity level of the light beam emitted from the emission device is controlled based on the calculated average error between the average value at the intensity level of the detected light beam and the target average value, and the calculated sampling error between the stored target sampling value and the acquired sampling value.

Normally, to ensure responsiveness and steadiness in negative feedback control of the emitted light beam, it is necessary to shorten the acquiring period of the sampling value.

On the other hand, information indicating contents cannot be transferred by the light beam emitted during the acquiring period of the sampling value. For example, when recording data on optical disc, data recorded on the optical disc during the acquiring period of the sampling value cannot be used as content information. Therefore, if the acquiring period of the sampling value is reduction, transmissions speed for transferring available data fall or available data area in space where the information indicating content is recorded is decreased.

Also, with the average APC method (averaging process) which uses the average value of light intensity levels within a fixed period as a basis for negative feedback control, since the intensity levels of the light beam emitted from the emission device must be changed in each condition. Therefore, if one of the intensity levels is changed while keeping the target value constant, the other intensity level is changed as well.

Accordingly, in the present invention, it is possible to change intensity levels of the light beam easily and independently. Furthermore, by performing the acquiring period of the sampling value without reducing this period, it is possible to perform the negative feedback control of the emitted light beam properly while ensuring responsiveness and steadiness in negative feedback control of the emitted light beam.

In one aspect of the present invention, the light beam output control apparatus is further provided with: an extraction device which extracts an average error component which represents a predetermined component contained in the average error calculated by the first error calculation device, wherein the control device controls the output intensity level of the light beam emitted from the emission device based on the extracted average error component and the sampling error calculated by the second error calculation device.

According to the present invention, the output intensity level of the light beam emitted from the emission device is controlled based on the extracted average error component and the sampling error Accordingly, it is possible to change intensity levels of the light beam easily and independently. Furthermore, in the case where the light beam of which light intensity is modulated is emitted from the emission device, it is possible to improve switching characteristics (transient characteristics) of the pulse form and light intensity level of the light beam based on the averaged values when frequency of the light beam emitted from the emission device changes.

In one aspect of the present invention, the light beam output control apparatus is further provided with: a timing setting device which presets the timing for acquiring the sampling value of the light beam emitted from the emission device, wherein the acquisition device acquires, as the sampling value, the light intensity level of the light beam emitted with the preset timing and detected by the detection device.

According to the present invention, the light intensity level of the light beam emitted is acquired with the preset timing and detected by the detection device as the sampling value.

Accordingly, if the sampling value is acquired when the light intensity level of the light beam becomes stable, it is possible to acquire the sampling value accurately.

The above object of present invention can be achieved by an optical pickup apparatus of the present invention. The optical pickup apparatus which emits a light beam to an optical recording medium to record data on the optical recording medium is provided with: an emission device which emits a light beam, of which intensity is modulated, to the optical recording medium based on data to be recorded on the optical recording medium; a detection device which detects at least part of the light beam emitted from the emission device; an acquisition device which acquires, as a sampling value, the light intensity level of the detected light beam emitted with a predetermined timing; a first storage device which prestores a value made into a target at a average value at the intensity level of the detected light beam as a target average value; a second storage device which stores a sampling value made into a target at the intensity level of the light beam acquired as the sampling value, as a target sampling value; a first error calculation device which calculates average error between the average value at the intensity level of the detected light beam and the target average value based on the light intensity level of the detected light beam and the stored target average value; a second error calculation device which calculates sampling error between the stored target sampling value and the acquired sampling value; and a control device which controls the output intensity level of the light beam emitted from the emission device, based on the calculated average error and the calculated sampling error.

According to the present invention, the output intensity level of the light beam emitted from the emission device is controlled based on the calculated average error between the average value at the intensity level of the detected light beam and the target average value, and the calculated sampling error between the stored target sampling value and the acquired sampling value.

Normally, to ensure responsiveness and steadiness in negative feedback control of the emitted light beam, it is necessary to shorten the acquiring period of the sampling value.

On the other hand, information indicating contents cannot be record on the optical disc by the light beam emitted during the acquiring period of the sampling value. Namely, when recording data on optical disc, data recorded on the optical disc during the acquiring period of the sampling value cannot be used as content information. Therefore, if the acquiring period of the sampling value is reduction, transmissions speed for transferring fall or available data area on the optical disc is decreased.

Also, with the average APC method (averaging process) which uses the average value of light intensity levels within a fixed period as a basis for negative feedback control, since the intensity levels of the light beam emitted from the emission device must be changed for each optical disc because of manufacturing variations in optical discs, variations in data write conditions, etc. Therefore, if one of the intensity levels is changed while keeping the target value constant, the other intensity level is changed as well.

On the other hand, in the present invention, it is possible to change intensity levels of the light beam easily and independently. Furthermore, by performing the acquiring period of the sampling value without reducing this period, it is possible to perform the negative feedback control of the emitted light beam properly while ensuring responsiveness and steadiness in negative feedback control of the emitted light beam.

In one aspect of the present invention, the optical pickup apparatus is further provided with: an extraction device which extracts an average error component which represents a predetermined component contained in the average error calculated by the first error calculation device, wherein the control device controls the output intensity level of the light beam emitted from the emission device based on the extracted average error component and the sampling error calculated by the second error calculation device.

According to the present invention, the output intensity level of the light beam emitted from the emission device is controlled based on the extracted average error component and the sampling error Accordingly, it is possible to change intensity levels of the light beam easily and independently. Furthermore, in the case where the light beam of which light intensity is modulated is emitted from the emission device, it is possible to improve switching characteristics (transient characteristics) of the pulse form and light intensity level of the light beam based on the averaged values when frequency of the light beam emitted from the emission device changes, for example, from read mode to write mode.

In one aspect of the present invention, the optical pickup apparatus is further provided with: a timing setting device which presets the timing for acquiring the sampling value of the light beam emitted from the emission device, wherein the acquisition device acquires, as the sampling value, the light intensity level of the light beam emitted with the preset timing and detected by the detection device.

According to the present invention, the light intensity level of the light beam emitted is acquired with the preset timing and detected by the detection device as the sampling value.

Accordingly, if the sampling value is acquired when the light intensity level of the light beam becomes stable, it is possible to acquire the sampling value accurately.

In one aspect of the present invention, in a case where timing information which indicates the timing for acquiring the sampling value of the light beam emitted from the emission device is prestored on an optical recording medium and is read out in advance, the optical pickup apparatus is further provided with: a timing setting device which presets the timing for acquiring the sampling value of the light beam emitted from the emission device, based on the timing information read out in advance; and wherein the acquisition device acquires, as the sampling value, the light intensity level of the light beam emitted with the timing and detected by the detection device.

According to the present invention, the light intensity level of the light beam emitted is acquired with the timing and detected by the detection device as the sampling value.

Accordingly, if the timing indicated by the timing information recorded on the optical recording medium is timing when the light intensity level of the light beam becomes stable, it is possible to acquire the sampling value accurately.

In one aspect of the present invention, in the case where a plurality of sampling values is acquired, the optical pickup apparatus is further provided with: the acquisition device acquires, as the sampling values, the light intensity levels of the light beam emitted in regular cycles and detected by the detection device.

According to the present invention, because the light intensity levels of the light beam emitted in regular cycles and detected by the detection device is acquired, it is possible to perform the output intensity level of the light beam in regular cycles In one aspect of the present invention, in a case where the emission device emits the light beam to the optical recording medium at least by switching the intensity of the light beam emitted from the emission device, depending on whether the optical pickup apparatus is in record mode in which the data is recorded on the optical recording medium or read mode in which the data is read out of the optical recording medium, and the acquisition device acquires the sampling value, the optical pickup apparatus is further provided with: the control device makes the emission device output the light beam at the intensity at least one of processing when reading data from the optical recording medium, when writing data on the optical recording medium, and when recording data on the optical recording medium is erased.

According to the present invention, the emission device outputs the light beam at the intensity at least one of processing when reading data from the optical recording medium, when writing data on the optical recording medium, and when recording data on the optical recording medium is erased.

Accordingly, in the present invention, if the light intensity level of the light beam becomes stable when reading data, when writing data or when recording data, it is possible to acquire the sampling value accurately.

In one aspect of the present invention, in a case where the data is recorded on the optical recording medium using multiple kinds of different partial data, the light beam of which intensity is modulated based on each kind of partial data, and the data is recorded on the optical recording medium, the optical pickup apparatus is further provided with: the emission device emits a light beam to the optical recording medium by switching between a multi-pulse beam for recording one item of the partial data using a plurality of pulsed lights and a single-pulse beam for recording one item of the partial data using one pulsed light; and the control device makes the light beam the emission device emit as the single-pulse beam with the preset timing with which the acquisition device acquires the sampling value.

According to the present invention, the light beam is emitted as single-pulse with the preset timing with which the sampling value is acquired.

Accordingly, in the present invention, because the sampling value is acquired when the light intensity level of the light beam becomes stable, it is possible to acquire the sampling value accurately.

The above object of present invention can be achieved by a light beam emission control method of the present invention. The light beam emission control method is provided with: an emission process of emitting a light beam from an emission device; a detection process of detecting at least part of the light beam emitted from the emission device; an acquisition process of acquiring, as a sampling value, the light intensity level of the detected light beam emitted with a predetermined timing; a first error calculation process of calculating average error between a average value at the intensity level of the detected light beam and a prestoring a value made into a target at a average value at the intensity level of the detected light beam as a target average value, based on the light intensity level of the detected light beam and the target average value; and a second error calculation process of calculating sampling error between a stored sampling value made into a target at the intensity level of the light beam acquired as the sampling value, as a target sampling value, and the acquired sampling value by acquisition process, wherein the light beam from the emission device is emitted in the emission process, based on the calculated average error and the calculated sampling error.

According to the present invention, the output intensity level of the light beam emitted from the emission device is controlled based on the calculated average error between the average value at the intensity level of the detected light beam and the target average value, and the calculated sampling error between the stored target sampling value and the acquired sampling value.

Normally, to ensure responsiveness and steadiness in negative feedback control of the emitted light beam, it is necessary to shorten the acquiring period of the sampling value.

On the other hand, information indicating contents cannot be transfer by the light beam emitted during the acquiring period of the sampling value. For example, when recording data on optical disc, data recorded on the optical disc during the acquiring period of the sampling value cannot be used as content information. Therefore, if the acquiring period of the sampling value is reduction, transmissions speed for transferring fall or available data area in space where the information indicating content is recorded is decreased.

Also, with the average APC method (averaging process) which uses the average value of light intensity levels within a fixed period as a basis for negative feedback control, since the intensity levels of the light beam emitted from the emission device must be changed for each optical disc because of manufacturing variations in optical discs, variations in data write conditions, etc. Therefore, if one of the intensity levels is changed while keeping the target value constant, the other intensity level is changed as well.

On the other hand, in the present invention, it is possible to change intensity levels of the light beam easily and independently. Furthermore, by performing the acquiring period of the sampling value without reducing this period, it is possible to perform the negative feedback control of the emitted light beam properly while ensuring responsiveness and steadiness in negative feedback control of the emitted light beam.

In one aspect of the present invention, the light beam emission control method is further provided with: an extraction process of extracting an average error component which represents a predetermined component contained in the average error calculated in the first error calculation process, wherein the emitting process controls the output intensity level of the light beam emitted from the emission device based on the extracted average error component and the sampling error calculated by the second error calculation device.

According to the present invention, the output intensity level of the light beam emitted from the emission device is controlled based on the extracted average error component and the sampling error Accordingly, it is possible to change intensity levels of the light beam easily and independently. Furthermore, in the case where the light beam of which light intensity is modulated is emitted from the emission device, it is possible to improve switching characteristics (transient characteristics) of the pulse form and light intensity level of the light beam based on the averaged values when frequency of the light beam emitted from the emission device changes.

In one aspect of the present invention, the light beam emission control method is further provided with: a timing setting device which presets the timing for acquiring the sampling value of the light beam emitted from the emission device, wherein the light intensity level of the light beam is emitted in the acquisition process, as the sampling value, with the preset timing and detected.

According to the present invention, the light intensity level of the light beam emitted is acquired with the preset timing and detected by the detection device as the sampling value.

Accordingly, if the sampling value is acquired when the light intensity level of the light beam becomes stable, it is possible to acquire the sampling value accurately.

The above object of present invention can be achieved by a recorded medium of the present inversion wherein a light beam emission control program is recorded so as to be read by a computer, the computer included in a light beam output control apparatus, the light beam emission control program causing the computer to function as: an emission control device which controls the emission of a light beam from an emission device; a detection device which detects at least part of the light beam emitted from the emission device; an acquisition device which acquires, as a sampling value, the light intensity level of the detected light beam emitted with a predetermined timing; a first error calculation device which calculates average error between a average value at the intensity level of the detected light beam and a prestoring a value made into a target at a average value at the intensity level of the detected light beam as a target average value, based on the light intensity level of the detected light beam and the target average value; and a second error calculation device which calculates sampling error between a stored sampling value made into a target at the intensity level of the light beam acquired as the sampling value, as a target sampling value, and the acquired sampling value, wherein the emission control device which controls emission of the light beam from the emission device, based on the calculated average error and the calculated sampling error.

According to the present invention, the output intensity level of the light beam emitted from the emission device is controlled based on the calculated average error between the average value at the intensity level of the detected light beam and the target average value, and the calculated sampling error between the stored target sampling value and the acquired sampling value.

Normally, to ensure responsiveness and steadiness in negative feedback control of the emitted light beam, it is necessary to shorten the acquiring period of the sampling value.

On the other hand, information indicating contents cannot be transfer by the light beam emitted during the acquiring period of the sampling value. For example, when recording data on optical disc, data recorded on the optical disc during the acquiring period of the sampling value cannot be used as content information. Therefore, if the acquiring period of the sampling value is reduction, transmissions speed for transferring fall or available data area in space where the information indicating content is recorded is decreased.

Also, with the average APC method (averaging process) which uses the average value of light intensity levels within a fixed period as a basis for negative feedback control, since the intensity levels of the light beam emitted from the emission device must be changed for each optical disc because of manufacturing variations in optical discs, variations in data write conditions, etc. Therefore, if one of the intensity levels is changed while keeping the target value constant, the other intensity level is changed as well.

Accordingly, in the present invention, it is possible to change intensity levels of the light beam easily and independently. Furthermore, by performing the acquiring period of the sampling value without reducing this period, it is possible to perform the negative feedback control of the emitted light beam properly while ensuring responsiveness and steadiness in negative feedback control of the emitted light beam.

In one aspect of the present invention, the light beam emission control program causing the computer to function as: an extraction device which extracts an average error component which represents a predetermined component contained in the average error calculated, wherein the control device controls the output intensity level of the light beam emitted from the emission device based on the extracted average error component and the sampling error calculated.

According to the present invention, the output intensity level of the light beam emitted from the emission device is controlled based on the extracted average error component and the sampling error Accordingly, it is possible to change intensity levels of the light beam easily and independently. Furthermore, in the case where the light beam of which light intensity is modulated is emitted from the emission device, it is possible to improve switching characteristics (transient characteristics) of the pulse form and light intensity level of the light beam based on the averaged values when frequency of the light beam emitted from the emission device changes.

In one aspect of the present invention, the light beam emission control program causing the computer to function as: a timing setting device which presets the timing for acquiring the sampling value of the light beam emitted from the emission device, wherein the acquisition device acquires, as the sampling value, the light intensity level of the light beam emitted with the preset timing and detected.

According to the present invention, the light intensity level of the light beam emitted is acquired with the preset timing and detected by the detection device as the sampling value.

Accordingly, if the sampling value is acquired when the light intensity level of the light beam becomes stable, it is possible to acquire the sampling value accurately.

BRIEF DESCRIPTION OF THE DRAWINGS

FIG. 2A is a first diagram showing relationship between multi-pulses and single-pulses in terms of heat buildup;

FIG. 2B is a second diagram showing relationship between multi-pulses and single-pulses in terms of heat buildup;

FIG. 2C is a third diagram showing relationship between multi-pulses and single-pulses in terms of heat buildup;

FIG. 4A is a first graph showing frequency characteristic of control voltage in negative feedback control of an optical pickup apparatus;

FIG. 4B is a second graph showing frequency characteristic of control voltage in negative feedback control of an optical pickup apparatus;

FIG. 4C is a third graph showing frequency characteristic of control voltage in negative feedback control of an optical pickup apparatus;

FIG. 5A is a first diagram illustrating a sampling process;

FIG. 5B is a second diagram illustrating a sampling process;

FIG. 9A is a first diagram illustrating effects of he first embodiment;

FIG. 9B is a second diagram illustrating effects of he first embodiment;

DESCRIPTION OF THE PREFERRED EMBODIMENT

Preferred embodiments of the present invention will be described with reference to the drawings.

The embodiments will be described below, citing a case in which a laser output control unit and optical pickup apparatus according to the present invention are applied to an optical pickup apparatus which records data on an optical recording medium and reproduces data from an optical recording medium by using a laser beam (light beam). As the optical recording medium, a writable optical disc (hereinafter referred to simply as an optical disc) will be used.

[First Embodiment]

To begin with, a first embodiment of the optical pickup apparatus will be described with reference to FIGS. 1 to 9.

First, construction of the optical pickup apparatus according to this embodiment will be described with reference to FIG. 1.

Figure 1:
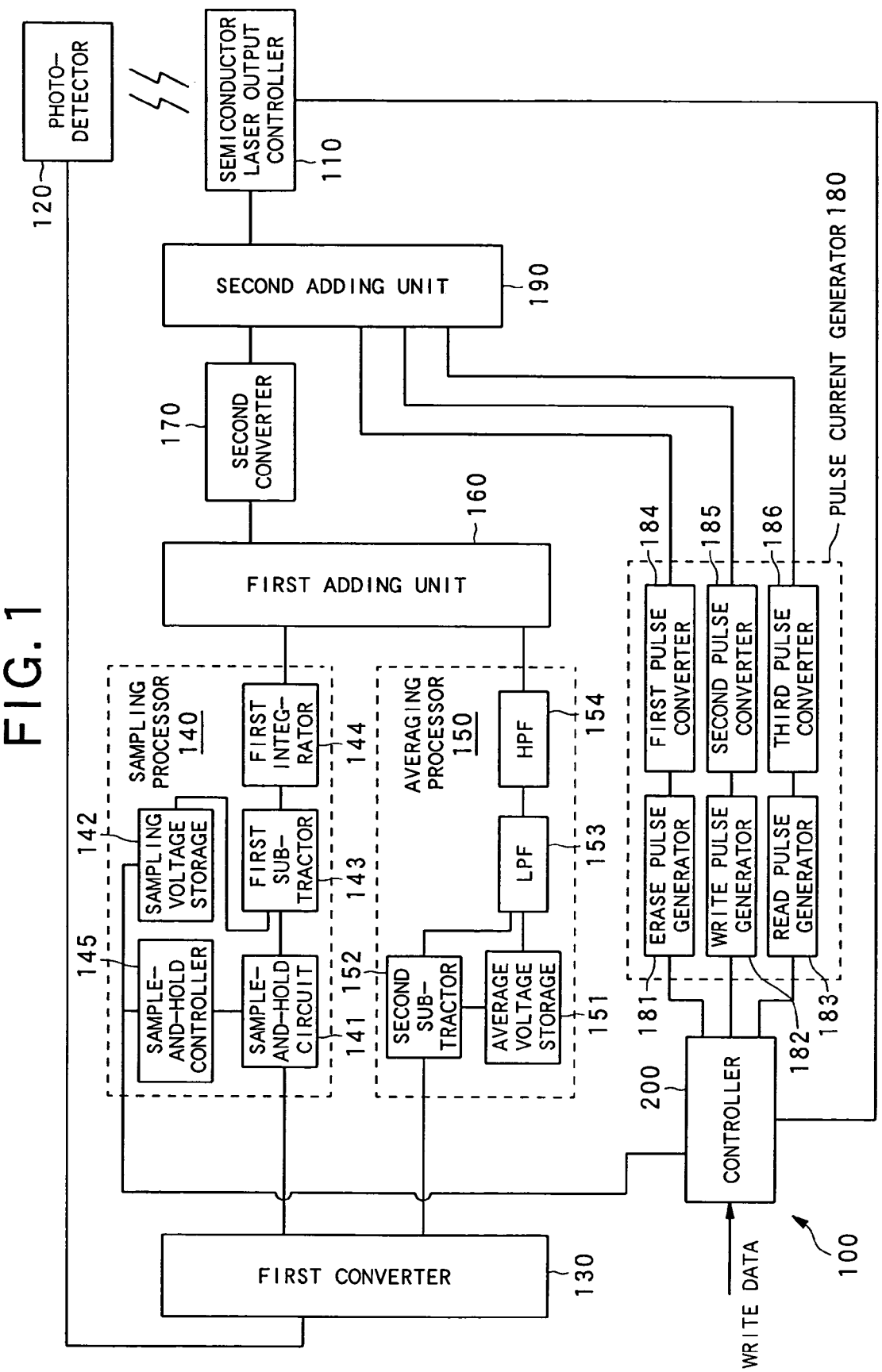
FIG. 1 is a block diagram showing the construction of an optical pickup apparatus according to a first embodiment.

FIG. 1 is a block diagram showing construction of the optical pickup apparatus according to this embodiment.

An optical pickup apparatus 100 shown in FIG. 1 comprises: a semiconductor laser output controller 110 which emits laser beam for recording and reproducing data to an optical disc; a photodetector 120 which detects part of the emitted laser beam and outputs currents based on the detected laser beam (hereinafter referred to as the detection currents); a first converter 130 which converts the detection currents into voltages (hereinafter referred to as the detection voltages); a sampling processor 140 which performs a sampling process on the detection voltages; an averaging processor 150 which performs an averaging process on the detection voltages converted by the first converter 130; a first adding unit 160 which adds the detection voltages which have undergone the sampling and averaging processes; a second converter 170 which converts the voltage added by a first adding unit 160 into a current; a pulse current generator 180 which generates erase current pulses; write current pulses; and read current pulses described later; a second adding unit 190 which adds the current pulses generated by the pulse current generator 180 and the current converted by the second converter 170; and controller 200 which controls the above components.

Incidentally, for example, the semiconductor laser output controller 110 serves as the emission device, the emission control device and the control device according to the present invention, and the photodetector 120 serves as the detection device according to the present invention.

Also, for example, the sampling processor 140 serves as the acquisition device, the second error calculation device, the second storage device, the timing setting device, the information acquisition device, and the sampling value setting device according to the present invention, and the averaging processor 150 serves as the first error calculation device, the extraction device, the first storage device, and the information acquisition device according to the present invention.

The semiconductor laser output controller 110 has a semiconductor laser circuit for emitting the laser beam, controls the intensity level and pulse form of output the laser beam based on control current outputted by the second converter 170, and emits the controlled the laser beam to an optical disc.

The semiconductor laser output controller 110 emits the laser beam in such a way as to form marks on a phase-change film, which is a recording film provided on the optical disc, and form spaces on the phase-change film by erasing marks already formed on it. Also, the semiconductor laser output controller 110 emits the laser beam in such a way as to read data represented by the marks or spaces already formed on the phase-change film.

Incidentally, amplitude pits formed on the phase-change film are referred to as marks, and data intervals for forming the amplitude pits on the optical disc or data intervals of amplitude pits formed on the optical disc are referred to as mark intervals. Blanks formed when the marks already formed on the phase-change film are erased are referred to as spaces, and data intervals for forming the spaces on the optical disc or data intervals formed on the optical disc are referred to as erase intervals.

Specifically, when writing write data on the optical disc, the semiconductor laser output controller 110 emits the laser beam to the optical disc by switching among the intensity level for forming marks on the optical disc (hereinafter referred to as the write level), intensity level for forming spaces on the optical disc (hereinafter referred to as the erase level), and intensity level for reading data from the optical disc (hereinafter referred to as the read level) based on the control current outputted from the second adding unit 190.

More specifically, when writing write data on the optical disc, the semiconductor laser output controller 110 emits the laser beam to the optical disc by switching between pulses generated at the write level (hereinafter referred to as the write pulses) and pulses generated at the erase level (hereinafter referred to as the erase pulses) based on the control current outputted from the second adding unit 190.

The write pulses consist of a plurality of pulses (hereinafter referred to as multi-pulses) which alternate between the write level and a intensity level which is extremely low compared with the write level (hereinafter referred to as the write reference level).

On the other hand, the erase pulses consist of a plurality of pulses which alternate between the erase level and a intensity level which is extremely low compared with the erase level (hereinafter referred to as the erase reference level) or consist of pulses of a single intensity level (hereinafter referred to as single-pulses).

Now, description will be given of the pulse form of the laser beam outputted from the semiconductor laser output controller 110, with reference to FIG. 2.

FIG. 2 is a diagram showing relationship between multi-pulses and single-pulses in terms of heat buildup.

According to this embodiment, write pulses and erase pulses are generally emitted as multi-pulses as shown in FIG. 2A because of heat buildup on the optical disc caused by laser beam irradiation. Only in a sampling process described later, erase pulses are emitted as single-pulses.

For example, if the erase pulses are always emitted as single-pulses, the optical disc is always irradiated with laser beam as shown in FIG. 2B. Consequently, heat builds up on the optical disc during an erase interval, increasing the temperature of the recording film on the optical disc.

However, if the erase pulses are emitted as multi-pulses, rises and falls of the laser beam emission level prevent heat buildup on the optical disc during the erase interval as shown in FIG. 2C.

Thus, according to this embodiment, the semiconductor laser output controller 110 normally emits the laser beam as multi-pulses to protect the recording film on the optical disc and avoid errors during data recording.

On the other hand, as described later, if the erase pulses of laser beam are emitted as multi-pulses during a sampling process, the light intensity level becomes unstable during acquisition of sample values, making it impossible to carry out the sampling process properly.

Thus, the semiconductor laser output controller 110 according to this embodiment emits the laser beam by switching from multi-pulses to single-pulses only in the sampling process described later.

Incidentally, in FIG. 2, the letter T in the mark intervals and erase intervals indicates a period which serves as a reference for run length when reading mark and space during reproduction of data recorded on the optical disc. Also, WRC indicates a cooling level during writing. It is a level used to cool the surfaces of the optical disc quickly to arrange the ends of the marks.

Furthermore, as described later, the semiconductor laser output controller 110 modulates intensity of a generated light beam according to control current generated based on multiple kinds of partial data (i.e., modulated data described later) and emits the light beam, of which intensity is modulated, to the optical disc.

In this way, based on the control current and various pulse currents generated at the instruction of the controller 200, the semiconductor laser output controller 110 according to this embodiment switches among read pulses, write pulses, and erase pulses, controls the switching between multi-pulses and single-pulses, and controls the intensity modulation of laser beam using modulated data.

The photodetector 120 detects part of the laser beam—for example, a few percent of the laser beam—outputted from the semiconductor laser output controller 110, generates detection current based on the detected laser beam, and outputs the generated detection current to the first converter 130.

The first converter 130 receives the detection current generated by the photodetector 120, converts the inputted detection current into detection voltage, and outputs the detection voltage to the sampling processor 140 and averaging processor 150.

The sampling processor 140 receives the detection voltage converted by the first converter 130, performs a sampling process on the inputted detection voltage, generates low-frequency control voltage for use in negative feedback control of low-frequency components of the laser beam, and outputs the low-frequency control voltage to the first adding unit 160.

Incidentally, details of the sampling processor 140 and the sampling process according to this embodiment will be described later.

The averaging processor 150 receives the detection voltage from the first converter 130, performs an averaging process on the inputted detection voltage as described later, generates high-frequency control voltage for use in negative feedback control of high-frequency components of the laser beam, and outputs the high-frequency control voltage to the first adding unit 160.

Incidentally, details of the averaging processor 150 and averaging process according to this embodiment will be described later.

The first adding unit 160 receives the low-frequency control voltage outputted from the sampling processor 140 and high-frequency control voltage outputted from the averaging processor 150, generates voltage by adding the inputted low-frequency control voltage and high-frequency control voltage as control voltage, and outputs the generated control voltage to the second converter 170.

The second converter 170 receives the control voltage outputted from the first adding unit 160, converts the inputted control voltage into current, and outputs the current to the second adding unit 190.

The pulse current generator 180 generates erase pulses, write pulses, and read pulses under the control of the controller 200, converts these pulses into control current, and outputs the current as control current to the semiconductor laser output controller 110 via the second adding unit 190.

Specifically, the pulse current generator 180 generates read pulses of single-pulse when reading data (hereinafter referred to as read mode) and generates the erase pulses of multi-pulse and write pulses of multi-pulse when writing data (hereinafter referred to as write mode). Also, it generates erase pulses as single-pulses during APC timing periods as described later.

As shown in FIG. 1, the pulse current generator 180 comprises: an erase pulse generator 181 which generates erase voltage pulses under the control of the controller 200; write pulse generator 182 which generates write voltage pulses under the control of the controller 200; read pulse generator 183 which generates read voltage pulses under the control of the controller 200; and a first pulse converter 184 which convert the voltage pulses into current pulses, a second pulse converter 185 which convert the voltage pulses into current pulses, and a third pulse converter 186 which convert the voltage pulses into current pulses. The pulse current generator 180 generates the pulses on instructions from the controller 200.

The pulse generators 181, 182, and 183 generate erase voltage pulses, write voltage pulses, or read voltage pulses based on instructions from the controller 200 concerning write mode or read mode and on a duty ratio preset by the controller 200, and output the generated erase voltage pulses, write voltage pulses, or read voltage pulses to the pulse converters 184, 185, and 186.

The first pulse converter 184 receives the erase voltage pulses outputted from the erase pulse generator 181, converts the inputted erase voltage pulses into erase current pulses, and outputs the erase current pulses to the second adding unit 190.

The second pulse converter 185 receives the write voltage pulses outputted from the write pulse generator 182, converts the inputted write voltage pulses into write current pulses, and outputs the write current pulses to the second adding unit 190.

The third pulse converter 186 receives the read voltage pulses outputted from the read pulse generator 183, converts the inputted read voltage pulses into read current pulses, and outputs the read current pulses to the second adding unit 190.

The controller 200 controls the current pulse generation done by the pulse current generator 180, and controls the sampling process and averaging process. Also, the controller 200 performs negative feedback control of the optical output of the laser beam via the semiconductor laser output controller 110 as described above.

Now, description will be given of the principle of the negative feedback control performed by the optical pickup apparatus 100 according to this embodiment, with reference to FIGS. 3 and 4.

Figure 3:
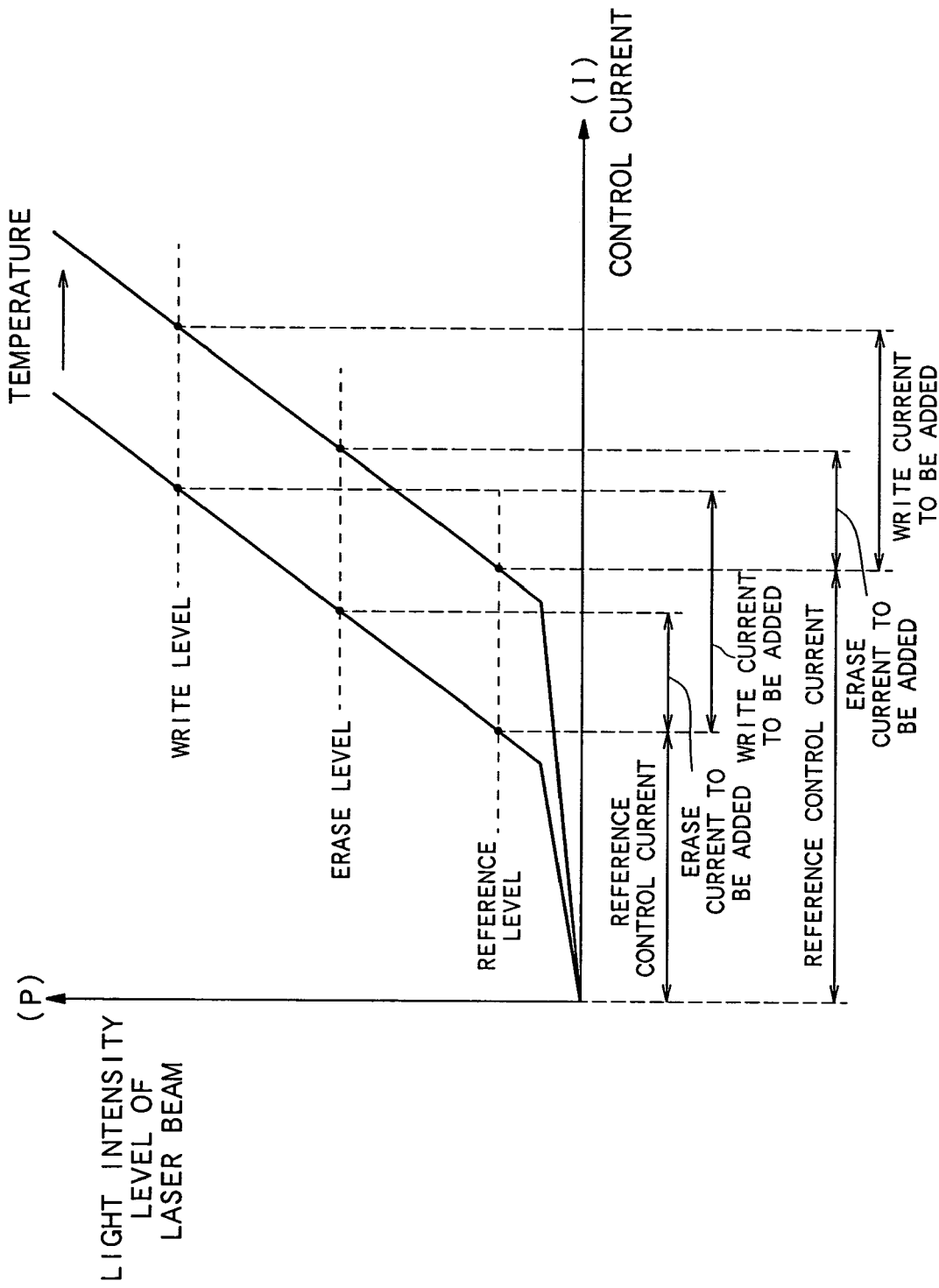
FIG. 3 is a diagram illustrating negative feedback control of an optical pickup apparatus.

FIG. 3 is a diagram illustrating the principle of negative feedback control. It is a graph showing relationship between IP characteristics and temperature of laser beam placed under negative feedback control. FIG. 4 is graphs showing frequency characteristics of control voltage in negative feedback control.

Normally, when writing data on a writable optical disc, if optical power P corresponding to the erase level at which spaces are generated and write level at which marks are generated is kept constant, the current values I change along with temperature changes of the semiconductor laser over time as shown in FIG. 3.

Thus, the optical pickup apparatus 100 cannot form marks and spaces on the optical disc in a suitable manner unless it controls the current values for the intensity levels of the light to be output from the semiconductor laser.

In contrast, even if the IP (current vs. optical power) characteristics of the laser change along with the temperature changes, the amount of change in the current value at the erase level or write level from the current value at a reference light intensity level (hereinafter referred to simply as the reference level) remains unchanged.

Consequently, once the current value at the reference level is established, the controller 200 does not need to control the current value at the erase level or current value at the data write level higher than the reference level in accordance with temperature changes.

Normally, when a semiconductor laser circuit which generates laser beam is driven, the gain of the laser beam generated is determined based on frequency characteristics of a drive source such as the drive current (voltage) which drives the circuit. Thus, stabilizing the frequency characteristics of the drive source will stabilize the gain of the laser beam as well.

On the other hand, when voltage is used as the drive source of the semiconductor laser circuit as is the case with this embodiment, the frequency characteristics of sampled control voltage are such that the gain is low at high frequencies as shown in FIG. 4A.

The frequency characteristics of averaged control voltage are such that the gain is low at low frequencies as shown in FIG. 4B.

Thus, according to this embodiment, the optical pickup apparatus 100 adds the averaged control voltage and sampled control voltage as shown in FIG. 4C, converts the resulting control voltage into current, and thereby obtains control current with stable frequency characteristics.

In other words, the optical pickup apparatus 100 adds the control current and current pulses generated based on write data, and thereby generates a drive current, which is a drive source of the semiconductor laser circuit, to generate laser beam.

±20 dB/dec shown in FIGS. 4A, 4B, and 4C indicates a frequency level which attenuates or increases by 20 decibels per decade, meaning that when the frequency increases tenfold, the gain is decreased or increased by 10 times.

In this way, according to this embodiment, to control the reference level changed with temperature changes, i.e., the reference level of the control current used to control the light intensity level of the laser beam, the controller 200 generates a drive current for driving the semiconductor laser circuit in accordance with temperature changes over time, generates a control current with stable frequency characteristics for negative feedback control, and controls of output of the light intensity of the laser beam to read data precisely.

Specifically, according to this embodiment, when reading data from the optical disc, when recording data-on the optical disc, or when erasing data already recorded on the optical disc, the controller 200 controls the light intensity level and pulse form of the laser beam emitted from the semiconductor laser output controller 110 by controlling the semiconductor laser output controller 110 and pulse current generator 180.

Incidentally, when reading data from the optical disc, laser beam of exceedingly high intensity will erase marks formed on the optical disc. Thus, when reading data from the optical disc, the controller 200 emits the laser beam at a low intensity level only sufficient to sense reflecting levels of marks and spaces.

Also, when recording data on the optical disc, the controller 200 controls the light intensity level of the laser beam, modulates intensity of the laser beam based on multiple kinds of partial data, and emits the laser beam, of which intensity is modulated, to the optical disc.

Specifically, according to this embodiment, 8-bit write data is modulated into 16-bit data for recording. Then, the controller 200 modulates intensity of the laser beam based on multiple kinds of partial data with different run lengths (hereinafter referred to as modulated data) resulting from the bit modulation and emits the laser beam of which intensity is modulated.

Incidentally, according to this embodiment, the controller 200 emits the laser beam to a phase-change film provided as a recording film on the optical disc, based on the modulated data, and thereby forms marks and spaces with different run lengths. That is, pits corresponding to data with different pulse widths and durations are formed on the optical disc based on the modulated data.

Furthermore, with the timing for emitting the laser beam to an APC area (hereinafter this timing will be referred to as the APC timing), the controller 200 according to this embodiment generates a pulse which represents the APC timing (hereinafter this pulse will be referred to as an APC timing pulse) and sampling pulses as described later based on control information recorded on the optical disc in advance. Then, the controller 200 controls the sampling processor 140 and other components based on the generated APC timing pulses and sampling pulses. Incidentally, the controller 200 may generate the APC timing pulses internally.

For example, according to this embodiment, the frequency of the APC timing pulse is set to 10 kHz and the pulse width of the APC timing pulse is set to a few μsec.

Also, the controller 200 generates the sampling pulses for a sampling process based on the modulated data inputted with the APC timing as described later.

Furthermore, the controller 200 outputs the generated APC timing pulses and sampling pulses to the sampling processor 140 and pulse current generator 180.

Incidentally, the data recorded in the APC area on the optical disc is treated during reproduction as data independent of content information to be recorded on the optical disc.

When OPC (Optimized Power Control) is performed to determine optimum conditions for a optical disc write operation by writing on a trial basis at the beginning of the write operation to each optical disc, the controller 200 according to this embodiment determines the reference level of the write or erase level and duty ratio, and target sample value (described later) for the given optical disc. The controller 200 stores the determined values internally, and outputs them to the sampling processor 140 and pulse current generator 180.

Next, the sampling processor 140 and sampling process according to this embodiment will be described with reference to FIG. 5.

FIG. 5 is a diagram illustrating the sampling process performed by the sampling processor 140.

The sampling processor 140 according to this embodiment receives a voltage value which represents the intensity level of the single-pulses emitted at the erase level from the semiconductor laser output controller 110 with a predetermined timing, acquires the voltage value of the single-pulses as a sample value, calculates the error between the acquired sample value and a preset target value, and generates a control voltage for negative feedback control of the laser beam based on the error.

Normally, multi-pulses consist of a plurality of pulses which alternate between the write level or erase level and a lower intensity level, and thus it is not possible to obtain a sample value at a stable intensity level.

Even in the case of single-pulses, the pulse waveform is not stable immediately after conversion from multi-pulses because of deficiencies with the photodetector 120 or with frequency characteristics or a transmission path during current-to-voltage conversion and thus because of the value during this period is not suited, it is suitable for this value to be acquired as a sample value by the sampling processor 140.

Thus, for a sampling operation, it is desirable for the sampling processor 140 to extract the sample value during a period in which the waveform of single-pulses is sufficiently stable.

For example, when using erase pulses for a sampling operation, if the erase pulses are multi-pulses as shown in FIG. 5A, the voltage level of the detection voltage inputted in the sampling processor 140 becomes unstable.

Consequently, in this case, just before and after the sampling processor 140 acquires a sample value, the control voltage outputted from the sampling processor 140 is prone to error. Thus, the sampling processor 140 cannot perform the sampling process properly.

On the other hand, if the erase pulses are single-pulses as shown in FIG. 5B, the voltage level of the detection voltage inputted in the sampling processor 140 becomes stable. Consequently, even just before and after the sampling processor 140 acquires a sample value, the control voltage outputted from the sampling processor 140 remains constant. Thus, the sampling processor 140 can perform the sampling process properly.

Therefore, according to this embodiment, when the controller 200 makes the pulse current generator 180 convert erase pulses into single-pulses, the controller 200 makes the sampling processor 140 generate sampling pulses a set amount of time earlier than the fall time of the erase pulses formed by the single-pulse. At the same time, the controller 200 makes the sampling processor 140 sample the detection voltage level inputted in the sampling processor 140, as a sample value.

Specifically, the controller 200 generates sampling pulses during an APC timing period to sample the pulse level as a sample value during a period of certain duration at a time earlier than the fall time of the erase pulses and outputs the sampling pulses to the sampling processor 140.

As shown in FIG. 1, the sampling processor 140 according to this embodiment comprises: a sample-and-hold circuit 141 which holds detection voltage sampled from inputted detection voltage during a predetermined period; a sampling voltage storage 142 which prestores the voltage value at a targeted erase level of the laser beam (hereinafter this voltage value will be referred to as the targeted sampling erase voltage); a first subtractor 143 which subtracts the sampled and held detection voltage (hereinafter referred to as the sample-and-hold voltage) from each targeted sampling voltage for calculating the error; a first integrator 144 which integrates the voltages resulting from the subtraction; and a sample-and-hold controller 145 which controls the sample-and-hold circuit 141 based on the APC timing pulses and sampling pulses outputted from the controller 200.

Incidentally, for example, the sampling voltage storage 142 serves as the first storage device according to the present invention.

The sample-and-hold circuit 141 receives the detection voltage outputted from the first converter 130, holds the inputted detection voltage at the voltage value assumed at a time specified by the sample-and-hold controller 145, and outputs the held value (sample value) to the first subtractor 143.

Incidentally, the sample-and-hold circuit 141 holds the sample value until the time specified by the sample-and-hold controller 145, i.e., until the next sample pulse is input, and then outputs the sample value to the first subtractor 143.

In the sampling voltage storage 142, the voltage value at a targeted erase level of the laser beam (hereinafter this voltage value will be referred to as the targeted sampling erase voltage) is stored. The sampling voltage storage 142 outputs the targeted sampling erase voltage to the first subtractor 143 at the instruction of the sample-and-hold controller 145.

For example, the sampling voltage storage 142 generates a preset sample value which will serve as a target value (hereinafter referred to as the target sample value). At the instruction of the controller 200, it generates targeted erase voltage when performing OPC (Optimized Power Control) to determine optimum conditions for a disc write operation by writing on a trial basis at the beginning of the write operation to each optical disc, and stores the targeted erase voltage which is generated in the inside.

The first subtractor 143 receives the sample value outputted from the sample-and-hold circuit 141 and the target sample value outputted from the sampling voltage storage 142, subtracts the inputted sample value from the inputted target sample value, and outputs the voltage value obtained by the subtraction to the first integrator 144.

The first integrator 144 receives the voltage values outputted from the first subtractor 143, integrates the inputted voltage values, thereby extracting low-frequency components, i.e., averaging the inputted voltage values, and outputs the resulting value to the first adding unit 160.

The sample-and-hold controller 145 receives the APC timing pulse and sampling pulses outputted from the controller 200 and controls the sample-and-hold circuit 141 and the sampling voltage storage 142 based on the APC timing pulse and sampling pulses outputted from the controller 200.

Next, the averaging processor 150 and averaging process according to this embodiment will be described.

The averaging processor 150 according to this embodiment calculates the average value of inputted detection voltages over a predetermined period of time as described above, compares the calculated average value and the target value, and performs negative feedback control of the light intensity of the semiconductor laser.

According to this embodiment, when writing data on the optical disc, the averaging processor 150 subtracts the detection voltage from a target value, which is a stored preset voltage value (hereinafter referred to as the target average voltage), passes the resulting voltage through a low pass filter (hereinafter referred to as the LPF) 153, and thereby averages the voltage.

Also, the averaging processor 150 passes the output voltage of the LPF through a high pass filter (hereinafter referred to as the HPF) 154 to extract high-frequency components, and thereby extract high-frequency control voltage for negative feedback control.

Specifically, the averaging processor 150 according to this embodiment comprises: an average voltage storage 151 in which target average voltages are stored; a second subtractor 152 which subtracts the detection voltage outputted the first converter 130 from each target average voltage; an LPF 153 used to average the voltages obtained by the subtraction; and a HPF 154 which extracts high-frequency components.

Incidentally, for example, the average voltage storage 151 serves as the first storage device according to the present invention.

In the average voltage storage 151, an average write voltage value (hereinafter referred to as the target average write voltage) and voltage value at the read level (hereinafter referred to as the target average read voltage) are prestored. The average voltage storage 151 outputs them to the second subtractor 152 by switching between them with the timing specified by the controller 200.

At the instruction of the controller 200, the average voltage storage 151 generates when performing OPC (Optimized Power Control) to determine optimum conditions for a disc write operation by writing on a trial basis at the beginning of the write operation to each optical disc, and stores the target average voltages which are generated on the inside.

The second subtractor 152 receives the detection voltage outputted from the first converter 130 and the target values outputted from the average voltage storage 151, subtracts the inputted detection voltage from the inputted target values, and outputs the voltage values obtained by the subtraction to the LPF 153.

The LPF 153 receives the voltage values obtained by the subtraction and outputted from the second subtractor 152, averages the inputted voltage values, and outputs the averaged voltage value to the HPF 154.

The HPF 154 receives the average voltage value outputted from the LPF 153, extracts high-frequency components from the averaged voltage value, and outputs the result to the first adding unit 160.

Next, description will be given of a negative feedback control operation in an APC area on the optical pickup apparatus 100 according to this embodiment during a write operation to a writable optical disc, with reference to FIGS. 6 to 8.

Figure 6:
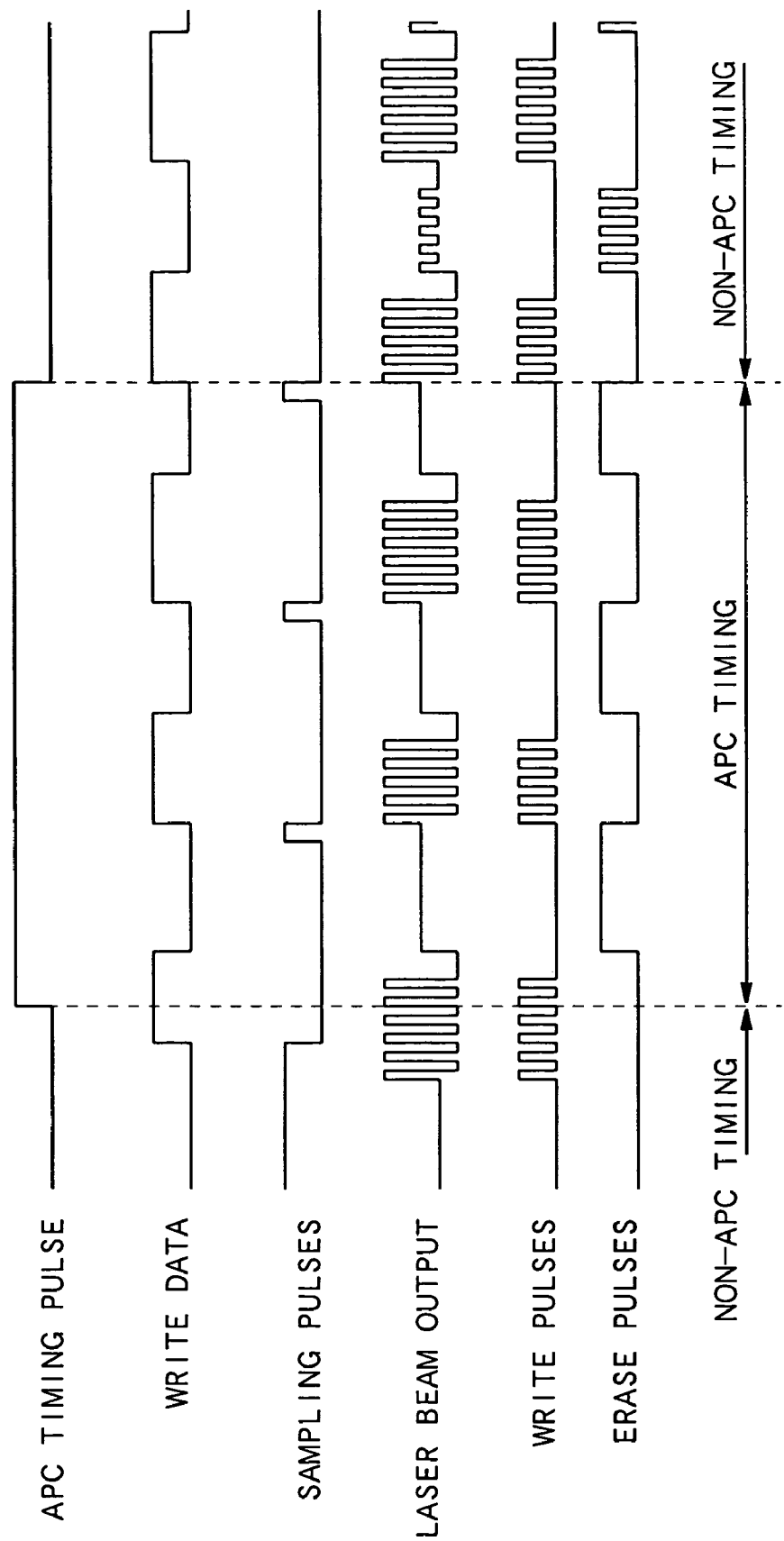
FIG. 6 is a timing chart illustrating a negative feedback control operation according to the first embodiment.
Figure 7:
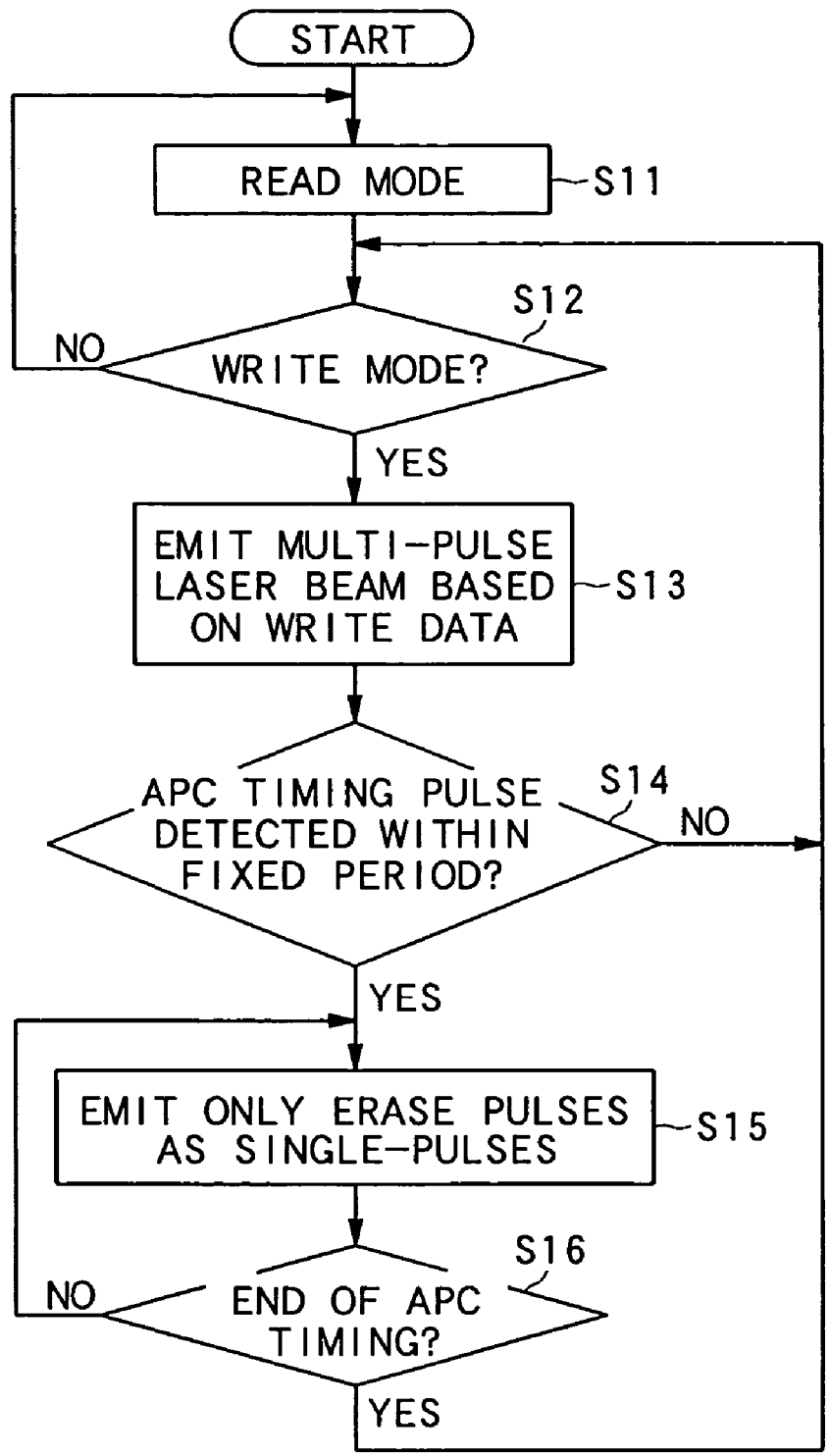
FIG. 7 is a flowchart showing a negative feedback operation (output switching control) according to the first embodiment.
Figure 8:
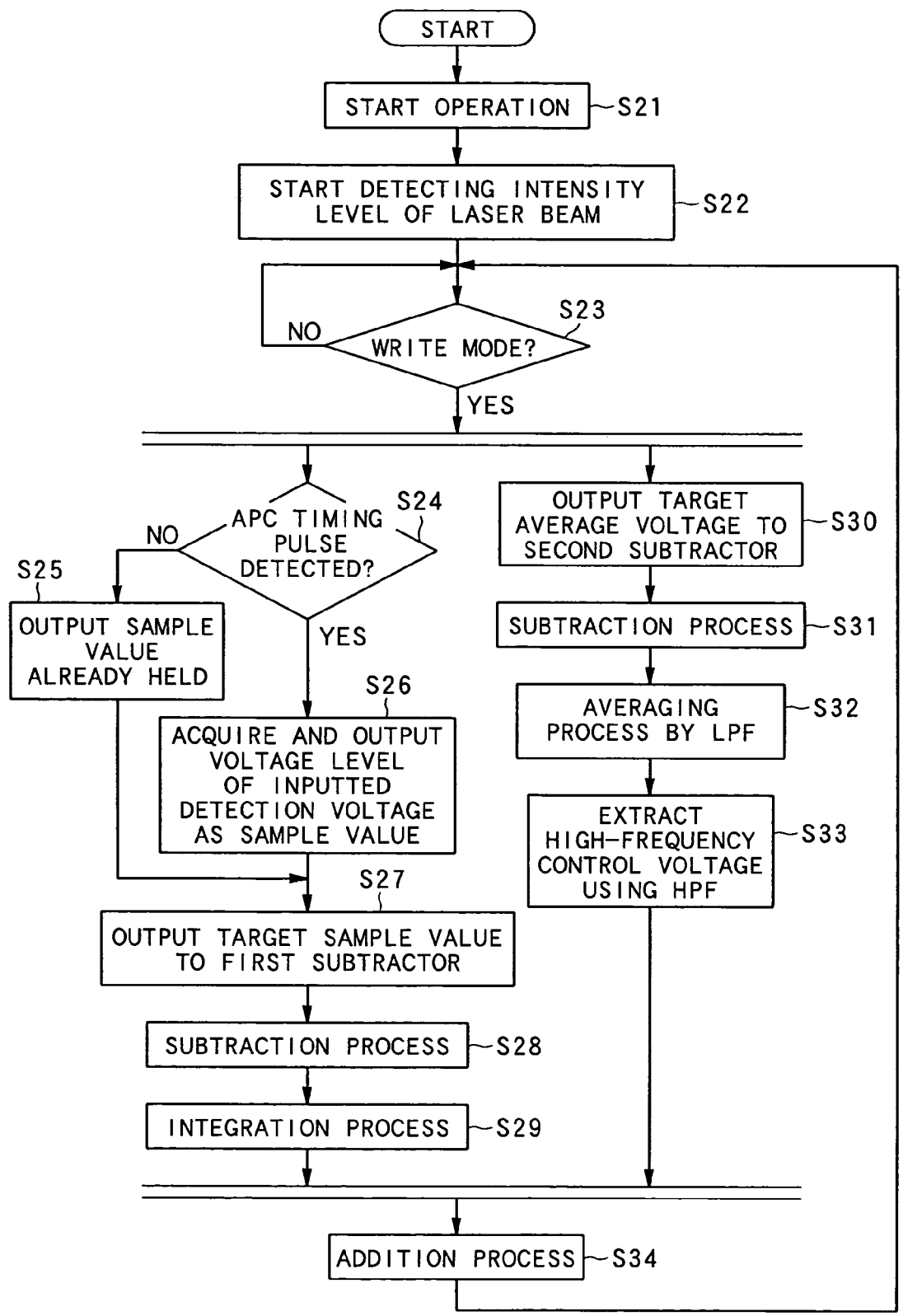
FIG. 8 is a flowchart showing a negative feedback operation (control current generation control) according to the first embodiment.

FIG. 6 is a diagram illustrating a negative feedback operation during a write operation according to this embodiment, FIG. 7 is a flowchart showing an output switching control operation for the laser beam according to this embodiment, and FIG. 8 is a flowchart showing a control current generation control operation according to this embodiment.

As shown in FIG. 6, according to this embodiment, in write mode in which data is written on the optical disc, the controller 200 constantly performs the averaging process described above based on detected detection voltage. Also the controller 200 generates erase pulses as single-pulses during a APC timing period based on the APC timing pulse and sampling pulses. Then, the controller 200 sets the timing for sampling pulses, causes the laser beam emitted as the erase pulses of single-pulse to be detected, and performs the sampling process described above.

Incidentally, on the optical pickup apparatus 100 according to this embodiment, the method for setting APC timings is not limited to the one described above. It is also possible to set APC timing in regular cycles based on control information recorded beforehand in a lead-in area of the optical disc and generate an APC timing pulse and sampling pulses with this timing.

According to this embodiment, a negative feedback control operation is performed by the controller 200 through an output switching control operation for the laser beam (hereinafter referred to as the output switching control operation) as well as sampling and averaging operations (hereinafter referred to as the control current generation control operation) performed concurrently with the output switching control operation.

First, the output switching control operation according to this embodiment will be described with reference to FIG. 7.

To begin with, by controlling the pulse current generator 180 and semiconductor laser output controller 110, the controller 200 makes the semiconductor laser output controller 110 emit single-pulse laser beam at the read level to read address information and the like recorded in the lead-in area of the optical disc in advance or to read pre-address information recorded in a write area of the optical disc if this processing of the controller 200 is performed after the process of Step S12 is performed (Step S11 (read mode)).

At this time, the optical pickup apparatus 100 as a whole reads data from the optical disc by controlling a spindle motor controller for controlling a spindle motor (not shown), a decoder for decoding read data, etc. and stores APC timing data, prerecorded address information, or the like in a memory (not shown).

Next, the controller 200 judges whether or not the optical pickup apparatus 100 is in write mode, based on instructions from a central control processor (not shown) which controls the entire optical pickup apparatus 100 (Step S12).

Specifically, if the optical pickup apparatus 100 is now in read mode, the controller 200 judges whether to switch from read mode to write mode. If the optical pickup apparatus 100 is now in write mode, the controller 200 judges whether or not the optical pickup apparatus 100 has switched from write mode to read mode. If the optical pickup apparatus 100 is already in write mode, the controller 200 judges whether or not it will remain in write mode.

For example, if the user enters a command instructing the central control processor to record content information on the optical disc or stop recording, or the central control processor detects a command to record content information on the optical disc or stop recording when a predetermined time elapses, the central control processor indicates the current mode—write mode or read mode—to the controller 200, and the controller 200 judges based on this whether or not the optical pickup apparatus 100 is in write mode.

If it is judged that the optical pickup apparatus 100 will remain in read mode or that the optical pickup apparatus 100 will switch from write mode to read mode, the controller 200 performs the process of Step S11, and the controller 200 makes the semiconductor laser output controller 110 emit the laser beam at the read level by controlling the pulse current generator 180 and semiconductor laser output controller 110.

On the other hand, if it is judged, based on instructions from the central control, processor (not shown), that the optical pickup apparatus 100 has switched from read mode to write mode or will remain in write mode, the controller 200 performs the following operations.

First, the controller 200 makes the pulse current generator 180 generate current pulses to emit the multi-pulse laser beam based on modulated data and makes the semiconductor laser output controller 110 emit the generated laser beam (Step S13).

Specifically, by controlling the pulse current generator 180 and semiconductor laser output controller 110, the controller 200 does the following: if modulated data for forming marks on the optical disc is entered, the controller 200 makes the semiconductor laser output controller 110 emit the write pulses laser beam of multi-pulse to the optical disc in accordance with the modulated data; and if modulated data for forming spaces on the optical disc is entered, the controller 200 makes the semiconductor laser output controller 110 emit the erase pulses laser beam of multi-pulse to the optical disc in accordance with the modulated data.

Incidentally, the process of Step S13 is performed during a non-APC timing period. During a non-APC timing period like this, the controller 200 makes the sampling processor 140 generate control voltage and output control current by performing subtraction and integration of sample values being held.

Thus, the second adding unit 190 adds the control current, which is generated by adding the sampled low-frequency control voltage and the averaged high-frequency control voltage and is converted from control voltage, to the currents generated by the pulse current generator 180, and the semiconductor laser output controller 110 controls the light intensity level of the laser beam based on the resulting control currents.

Next, the controller 200 judges whether or not an APC timing pulse generated internally within a fixed period has been detected (Step S14). If no APC timing pulse is detected, the controller 200 performs the process of Step S12.

On the other hand, if the controller 200 detects an APC timing pulse within the fixed period, it outputs the APC timing pulse and sampling pulses to the sampling processor 140 and the pulse current generator 180. Furthermore, the controller 200 makes the sampling processor 140 and the pulse current generator 180 generate only erase pulses as single-pulses during the APC timing period, and makes the semiconductor laser output controller 110 emit the laser beam by switching between the write pulses of multi-pulse and the erase pulses of single-pulse (Step S15).

Specifically, the controller 200 makes the pulse current generator 180 generate the write pulses of multi-pulse and the erase pulses of single-pulse and the semiconductor laser output controller 110 emit the single-pulse laser beam and the multi-pulse laser beam.

Next, the controller 200 judges whether the APC timing period ended, by checking for an APC timing pulse (Step S16). If the APC timing period has not ended yet, the controller 200 performs the process of Step S15. If the APC timing period has ended, the controller 200 performs the process of Step S12.

Incidentally, details of control current generation control in the sampling and averaging operations will be described later.

In this way, when writing data on an optical disc, the controller 200 according to this embodiment controls the light intensity of the laser beam emitted from the semiconductor laser output controller 110 and controls the pulse form of the laser beam by switching it.

Next, description will be given of control current generation control according to this embodiment and operations of relevant parts, with reference to FIG. 8.

When the optical pickup apparatus 100 starts operation (Step S21), the photodetector 120 detects the laser beam outputted from the semiconductor laser output controller 110 and outputs the intensity level of the laser beam to the sampling processor 140 and averaging processor 150 via the first converter 130 (Step S22).

Incidentally, as long as the semiconductor laser output controller 110 outputs the laser beam, the photodetector 120 detects the emitted the laser beam.

Next, based on instructions from the central control processor (not shown), the controller 200 judges whether or not the optical pickup apparatus 100 is in write mode (Step S23).

Specifically, like in Step S12 of the output switching control operation, based on instructions from the central control processor (not shown), the controller 200 judges whether or not the optical pickup apparatus 100 has switched from read mode to write mode or whether or not the optical pickup apparatus 100 has switched from write mode to read mode. If the optical pickup apparatus 100 is already in write mode, the controller 200 judges whether or not it will remain in write mode.

If it is judged that the optical pickup apparatus 100 is in write mode, the controller 200 notifies the sampling processor 140 and averaging processor 150 to that effect. Then, the sampling processor 140 and averaging processor 150 perform the sampling process and averaging process (described below) concurrently.

When the optical pickup apparatus 100 enters write mode, the controller 200 outputs generated APC timing pulses and sampling pulses to the sample-and-hold controller 145 with their timings.

[Sampling Process]

First, the sample-and-hold controller 145 judges whether or not an APC timing pulse is entered within a fixed period (Step S24). If no APC timing pulse is detected within the fixed period (a non-APC timing period), the sample-and-hold controller 145 makes the sample-and-hold circuit 141 output the sample value it holds to the first subtractor 143 (Step S25) and performs the process of Step S27.

Incidentally, according to this embodiment, the sample value is held by the sample-and-hold circuit 141 defaults to "0."

If an APC timing pulse is detected within the fixed period or an APC timing pulse is detected continuously (an APC timing period), the sample-and-hold controller 145 makes the sample-and-hold circuit 141 acquire, as a sample value, the voltage level of detection voltage inputted based on the sample pulses outputted from the controller 200 and makes the sample-and-hold circuit 141 output the acquired sample value to the first subtractor 143 (Step S26).

Incidentally, the sample-and-hold circuit 141 holds the acquired sample, value until instructed by the sample-and-hold controller 145 to acquire a new sample value.

Next, the sample-and-hold controller 145 makes the sampling voltage storage 142 output the target sample value it stores to the first subtractor 143 (Step S27).

Upon receiving the sample value and target sample value, the first subtractor 143 subtracts the inputted sample value from the inputted target sample value and outputs the resulting voltage value to the first integrator 144 (Step S28).

Upon receiving the voltage value obtained by the subtraction, the first integrator 144 integrates the inputted voltage value, generates control voltage, and outputs the generated control voltage to the first adding unit 160 (Step S29).

[Averaging Process]

Upon being informed by the controller 200 that the optical pickup apparatus 100 enters the write mode, the average voltage storage 151 outputs the target average voltage it stores to the second subtractor 152 (Step S30).

Incidentally, according to this embodiment, target average write voltage is used as the target average voltage in Step S30.

Upon receiving the detection voltage outputted from the first converter 130 and the target average voltage, the second subtractor 152 subtracts the inputted detection voltage from the inputted target average voltage and outputs the resulting voltage value to the LPF 153 (Step S31).

Upon receiving the voltage value obtained by the subtraction, the LPF 153 filters the inputted voltage value, thereby generates average voltage, and outputs the average voltage to the HPF 154 (Step S32).

Then, upon receiving the filtered average voltage, HPF 154 extracts high-frequency components from the average voltage and outputs them to the first adding unit 160 (Step S33).

In this way, according to this embodiment, the sampling process and the averaging process are performed concurrently, and the processed voltages are output to the first adding unit 160.

Then, upon receiving the sampled low-frequency control voltage and the averaged high-frequency control voltage, the first adding unit 160 adds the low-frequency control voltage and the high-frequency control voltage to generate control voltage, and outputs the generated control voltage to the second converter 170 (Step S33).

Then, upon receiving the control voltage, the second converter 170 converts the received control voltage into control current and outputs the control current to the second adding unit 190. The controller 200 performs the process of Step S23 (Step S34).

According to this embodiment, when control current generation control is performed in this way, since the second adding unit 190 adds the control current and pulse currents, the semiconductor laser output controller 110 can perform negative feedback control of the light intensity of the laser beam.

As described above, according to this embodiment, the optical pickup apparatus 100 comprises: the semiconductor laser output controller 110 for emitting a light beam, of which intensity is modulated, based on write data to be written on an optical disc; photodetector 120 for detecting at least part of the laser beam emitted from the semiconductor laser output controller 110; the averaging processor 150 for calculating the average value of the detection voltages of the detected laser beam as well as calculates average error between the prestored target average voltage, which is a targeted average value of the detection voltages, and the calculated average value; the sampling processor 140 for acquiring detection voltage of a light beam emitted with a preset timing (during an APC timing period) as a sample value and calculates sampling error between the prestored target sampling voltage and the acquired sample value; and the controller 200 for controlling the output intensity level of the laser beam emitted from the semiconductor laser output controller 110, based on the calculated average error and the calculated sampling error.

According to this embodiment with the above configuration, when recording write data on an optical disc by modulating the intensity level of the laser beam outputted from a semiconductor laser, the optical pickup apparatus 100 can easily and independently change intensity levels or irradiation times of the laser beam and can record the write data without reducing the data recording area on the optical disc.

Normally, to ensure responsiveness and steadiness in negative feedback control of the emitted laser beam when recording write data, it is necessary to shorten the sampling period of a sampling process.

On the other hand, the data recorded on the optical disc during a sampling process cannot be used as write data such as content information or its control information. Therefore, if the period of the sampling process is reduction, an available data area on the optical disc is decreased.

Also, with the average APC method (averaging process) which uses the average value of light intensity levels within a fixed period as a basis for negative feedback control, since the intensity levels, i.e., the erase level and write level, of the laser beam emitted from the semiconductor laser must be changed for each optical disc because of manufacturing variations in optical discs, variations in data write conditions, etc. Therefore, if one of the intensity levels is changed while keeping the target value constant, the other intensity level is changed as well.

Specifically, as shown in FIG. 9A, when writing data on a rewritable optical disc, if the level of erase pulses (or the level of write pulses) alone are changed while keeping the target value for negative feedback control constant at the output level of the laser beam of the semiconductor laser, the level of write pulses (or the level of erase pulses) is changed as well.

Normally, when writing information on an optical disc, if the write pulses of multi-pulse or erase pulses of multi-pulse are used, the duty ratio (irradiation time of laser beam) of the multi-pulses needs to be changed for each optical disc because of heat buildup on the optical disc.

However, with the average APC method, if the duty ratio of write pulses are changed with the target value which serve as a basis for negative feedback control kept constant as shown in FIG. 9B, the peak power of the write pulses of multi-pulse is changed because an average value over a set period is used as the target value.

According to this embodiment, the sampling process allows the optical pickup apparatus 100 to change intensity levels or irradiation times of the laser beam easily and independently. Also, by performing an averaging process without reducing the period of the sampling process, the optical pickup apparatus 100 can perform the negative feedback control of emitted laser beam properly while ensuring responsiveness and steadiness in negative feedback control of the emitted laser beam.

Furthermore, according to this embodiment, the optical pickup apparatus 100 comprises the HPF 154 which extracts predetermined high-frequency components from the control voltage calculated by the averaging processor 150, and the controller 200 is configured to control the output intensity level of the laser beam emitted from the semiconductor laser output controller 110 based on the extracted high-frequency components and the control voltage calculated through the sampling process.

According to this embodiment with the above configuration, the sampling process allows the optical pickup apparatus 100 to change modulated intensity levels or irradiation times of laser beam easily and independently. Also, when the status of the optical pickup apparatus 100 changes, for example, from read mode to write mode, the optical pickup apparatus 100 can improve switching characteristics (transient characteristics) of the pulse form and light intensity level of the laser beam by adding averaged values.

According to this embodiment, the optical pickup apparatus 100 controls the emission of laser beam when recording write data on an optical disc. However, if the optical pickup apparatus 100 which comprises the photodetector 120 and semiconductor laser circuit is further equipped with computer and a recording medium, a negative feedback control program may be stored on the recording medium and read by the computer to perform negative feedback control in the manner described above.

[Second Embodiment]

A second embodiment of the optical pickup apparatus will be described with reference to FIGS. 10 to 11.

The optical pickup apparatus according to this embodiment is characterized in that it uses the read pulses for negative feedback control in contrast to use the write pulses for negative feedback control in the first embodiment. In other respects, the optical pickup apparatus according to this embodiment is the same as the first embodiment. Thus, components will be denoted by the same reference numerals as the corresponding components of the first embodiment and description thereof will be omitted.

Figure 10:
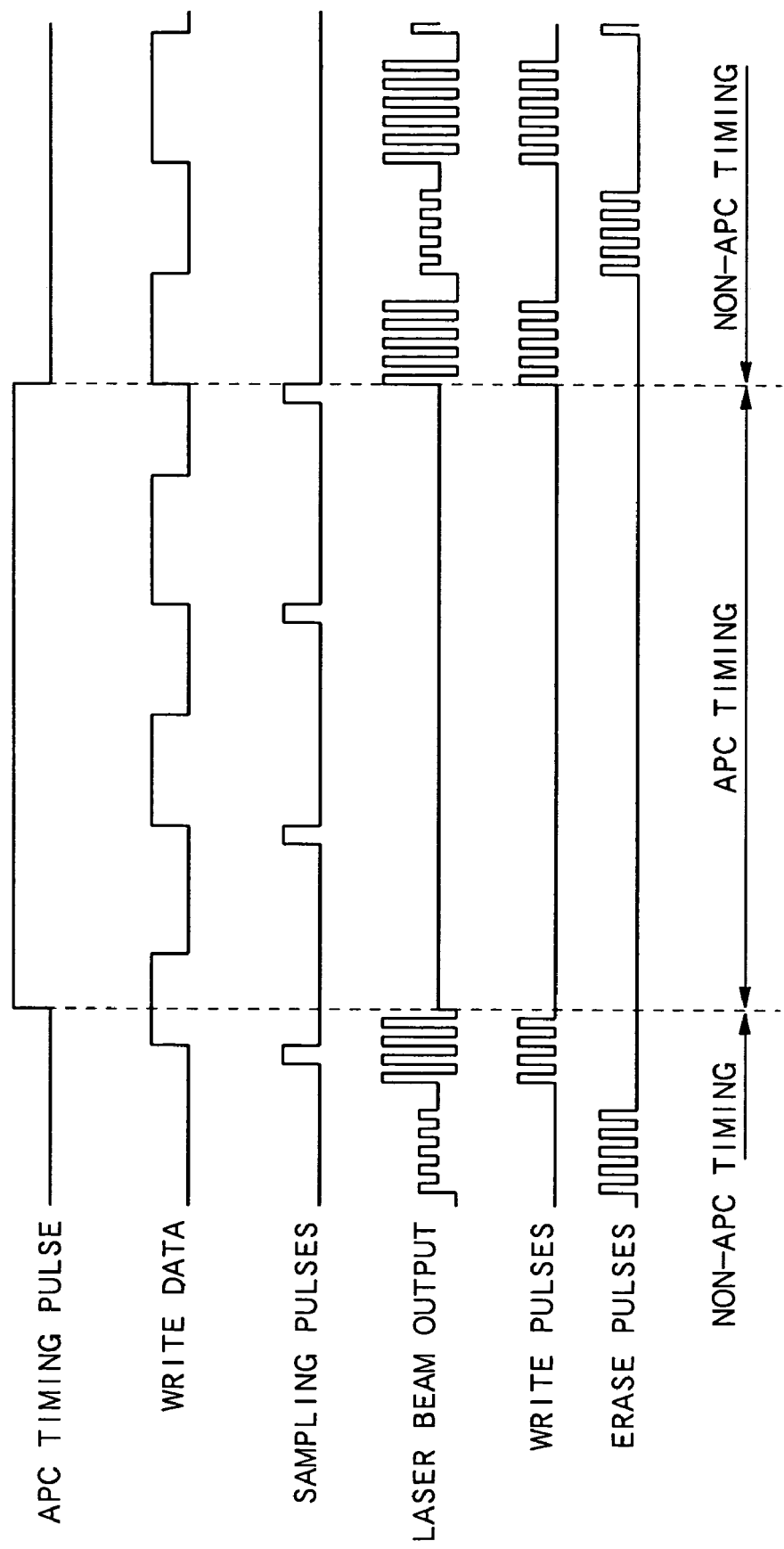
FIG. 10 is a timing chart illustrating a negative feedback control operation according to a second embodiment.
Figure 11:
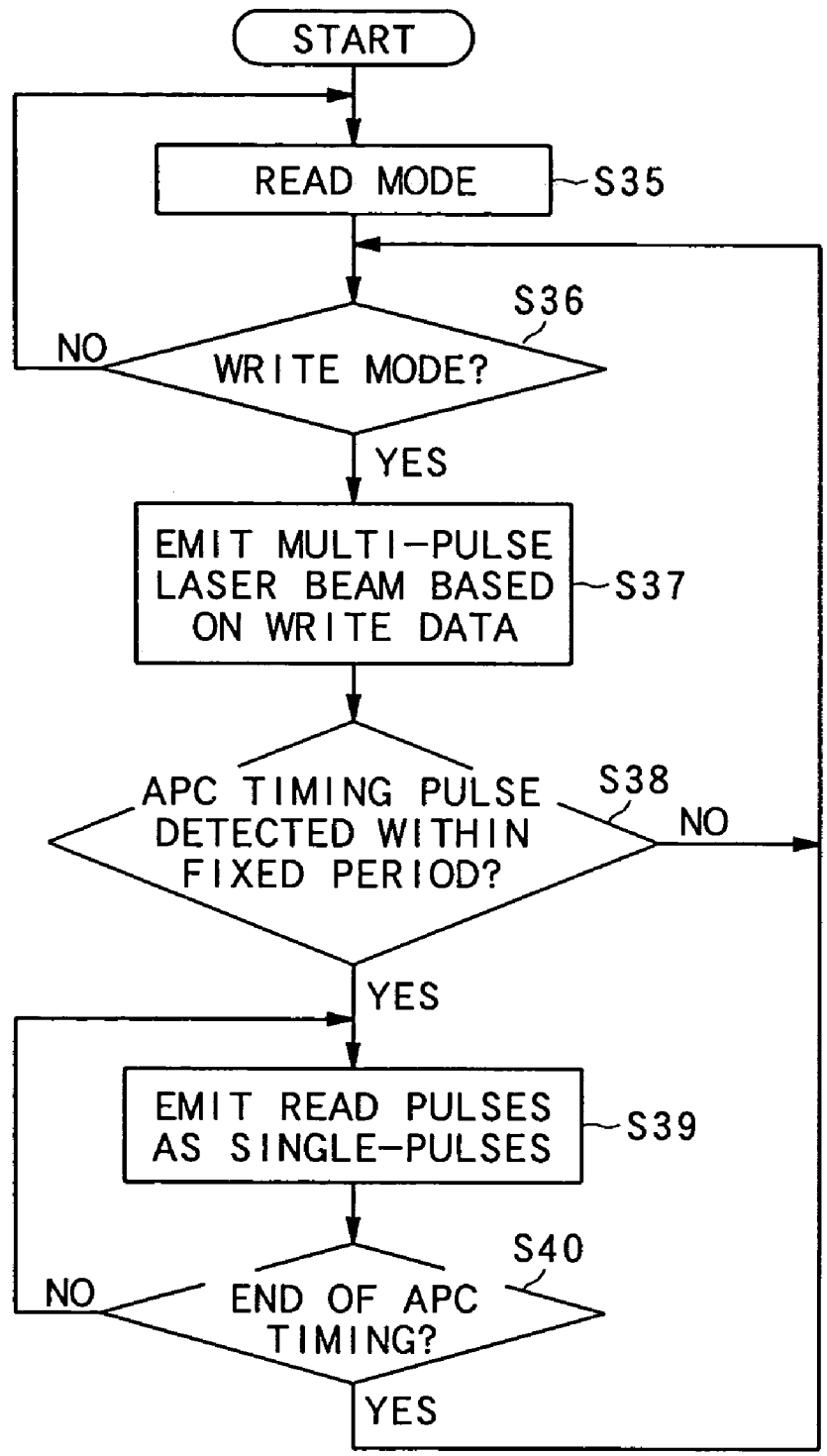
FIG. 11 is a flowchart showing a negative feedback operation (output switching control) according to the second embodiment.

FIG. 10 is a diagram illustrating a negative feedback operation during a data write operation according to this embodiment, and FIG. 11 is a flowchart showing an output switching control operation for the laser beam according to this embodiment.

As shown in FIG. 10, according to this embodiment, the optical pickup apparatus 100 constantly performs the averaging process based on detected detection voltage in write mode in which write data is recorded on an optical disc. Also, the optical pickup apparatus 100 generates the single-pulse read pulses (not shown) during an APC timing period based on an APC timing pulse and a sampling pulses, detects the laser beam emitted based on the read pulses, in sync with the sampling pulses, and thereby performs a sampling process like the one described above.

As suggested earlier, the optical pickup apparatus 100 according to this embodiment sets the APC timing in regular cycles based on control information recorded beforehand in a lead-in area of the optical disc and generates the APC timing pulse and sampling pulses with this timing.

According to this embodiment, a negative feedback control operation is performed by the controller 200 that switches pulse form of the laser beam through an output switching control operation and control current generation control operation.

Next, the output switching control operation according to this embodiment will be described with reference to FIG. 11.

To begin with, by controlling the pulse current generator 180 and semiconductor laser output controller 110, the controller 200 makes the semiconductor laser output controller 110 emit the single-pulse laser beam at the read level to read address information and the like recorded in the lead-in area of the optical disc in advance or to read pre-address information recorded in a data write area of the optical disc if this processing of controller 200 is performed after the process of Step S35 is performed (Step S35 (read mode)).

At this time, the optical pickup apparatus 100 as a whole reads data from the optical disc by controlling a spindle motor controller for controlling a spindle motor (not shown), a decoder for decoding read data, etc. and stores APC timing data, prerecorded address information, or the like in a memory (not shown).

Next, the controller 200 judges whether or not the optical pickup apparatus 100 is in write mode, based on instructions from a central control processor (not shown) which controls the entire optical pickup apparatus 100 (Step S36).

Specifically, if the optical pickup apparatus 100 is now in read mode, the controller 200 judges whether to switch from read mode to write mode. If the optical pickup apparatus 100 is now in write mode, the controller 200 judges whether or not the optical pickup apparatus 100 has switched from write mode to read mode. If the optical pickup apparatus 100 is already in write mode, the controller 200 judges whether or not it will remain in write mode.

If it is judged that the optical pickup apparatus 100 will remain in write mode or that the optical pickup apparatus 100 will switch from read mode to read mode, the controller 200 performs the process of Step S35, and the controller 200 makes the semiconductor laser output controller 110 emit the laser beam at the read level, by controlling the pulse current generator 180 and semiconductor laser output controller 110.

On the other hand, if it is judged, based on instructions from the central control processor (not shown), that the optical pickup apparatus 100 has switched from read mode to write mode or will remain in write mode, the controller 200 performs the following operations.

First, by controlling the semiconductor laser output controller 110 and the pulse current generator 180, the controller 200 makes the semiconductor laser output controller 110 emit the multi-pulse laser beam based on modulated data (Step S37).

Specifically, by controlling the pulse current generator 180 and semiconductor laser output controller 110, the controller 200 does the following: if modulated data for forming marks on the optical disc is entered, the controller 200 makes the semiconductor laser output controller 110 emit the write pulses laser beam of multi-pulse to the optical disc in accordance with the modulated data. Also, if modulated data for forming spaces on the optical disc is entered, the controller 200 makes the semiconductor laser output controller 110 emit the erase pulses laser beam of multi-pulse to the optical disc in accordance with the modulated data.

Incidentally, the process of Step S36 is performed during a non-APC timing period. During a non-APC timing period like this, the controller 200 makes the sampling processor 140 generate the control voltage and output the control current by performing subtraction and integration of sample values being held.

Thus, the second adding unit 190 adds the control current, which is generated by adding the sampled low-frequency control voltage and the averaged high-frequency control voltage and is converted from control voltage, to the currents generated by the pulse current generator 180, and the semiconductor laser output controller 110 controls the light intensity level of the laser beam based on the resulting control currents.

Next, the controller 200 judges whether or not an APC timing pulse generated internally within a fixed period has been detected (Step S38). If no APC timing pulse is detected, the controller 200 performs the process of Step S36.

On the other hand, if the controller 200 detects an APC timing pulse within the fixed period, the controller 200 outputs the APC timing pulse and sampling pulses to the sampling processor 140 and the pulse current generator 180. Furthermore, the controller 200 makes the pulse current generator 180 generate the single-pulse read pulses during the APC timing period, and makes the semiconductor laser output controller 110 emit the read pulses of the laser beam (Step S39).

Next, the controller 200 judges whether or not the APC timing period ended, by checking for an APC timing pulse (Step S40). If the APC timing period has not ended yet, the controller 200 performs the process of Step S39. If the APC timing period has ended, the controller 200 performs the process of Step S36.

In the control current generation control according to this embodiment, the laser beam is emitted to the optical disc at the light intensity level in read mode during the APC timing period. Operations of the other components are the same as those of the first embodiment, and thus description thereof will be omitted (see FIG. 8).

In this way, when writing data on an optical disc, this embodiment controls the light intensity of the laser beam emitted from the semiconductor laser output controller 110 and controls the pulse form of the laser beam by switching it.

As described above, according to this embodiment, as in the case of the first embodiment, the optical pickup apparatus 100 comprises: the semiconductor laser output controller 110 for emitting a light beam, of which intensity is modulated, based on write data to be written on an optical disc; the photodetector 120 for detecting at least part of the laser beam emitted from the semiconductor laser output controller 110; the averaging processor 150 for calculating the average value of the detection voltages of the detected laser beam as well as calculates average error between the prestored target average voltage, which is a targeted average value of the detection voltages, and the calculated average value; the sampling processor 140 for acquiring detection voltage of a light beam emitted with a preset timing (during an APC timing period) as a sample value and calculates sampling error between the prestored target sampling voltage and the acquired sample value; and the controller 200 for controlling the output intensity level of the laser beam emitted from the semiconductor laser output controller 110, based on the calculated average error and the calculated sampling error.

According to this embodiment with the above configuration, when recording write data on an optical disc by modulating the intensity level of the laser beam outputted from a semiconductor laser, the optical pickup apparatus 100 can easily and independently change intensity levels or irradiation times of the laser beam and can record the write data without reducing the data recording area on the optical disc.

Furthermore, according to this embodiment, the optical pickup apparatus 100 comprises the HPF 154 which extracts predetermined high-frequency components from the control voltage calculated by the averaging processor 150, and the controller 200 is configured to control the output intensity level of the laser beam emitted from the semiconductor laser output controller 110 based on the extracted high-frequency components and the control voltage calculated through the sampling process.

According to this embodiment with the above configuration, as in the case of the first embodiment, the sampling process allows the optical pickup apparatus 100 to change modulated intensity levels or irradiation times of laser beam easily and independently. Also, when the status of the optical pickup apparatus 100 changes, for example, from read mode to write mode, the optical pickup apparatus 100 can improve switching characteristics (transient characteristics) of the pulse form and light intensity level of the laser beam by adding averaged values.

According to this embodiment, the optical pickup apparatus 100 controls the emission of laser beam when recording write data on an optical disc. However, if the optical pickup apparatus 100 which comprises the photodetector 120 and semiconductor laser circuit is further equipped with computer and a recording medium, a negative feedback control program may be stored on the recording medium and read by the computer to perform negative feedback control in the manner described above.

According to this embodiment, the optical pickup apparatus 100 controls the emission of laser beam when recording write data on an optical disc. However, if the optical pickup apparatus 100 which comprises the photodetector 120 and semiconductor laser circuit is further equipped with computer and a recording medium, a negative feedback control program may be stored on the recording medium and read by the computer to perform negative feedback control in the manner described above.

[Third Embodiment]

A third embodiment of the optical pickup apparatus will be described with reference to FIGS. 12 to 13.

The optical pickup apparatus according to this embodiment is characterized in that it uses erase pulses of single-pulse for negative feedback control in contrast to use write pulses for negative feedback control in the first embodiment. In other respects, the optical pickup apparatus according to this embodiment is the same as the first embodiment. Thus, components will be denoted by the same reference numerals as the corresponding components of the first embodiment and description thereof will be omitted.

Figure 12:
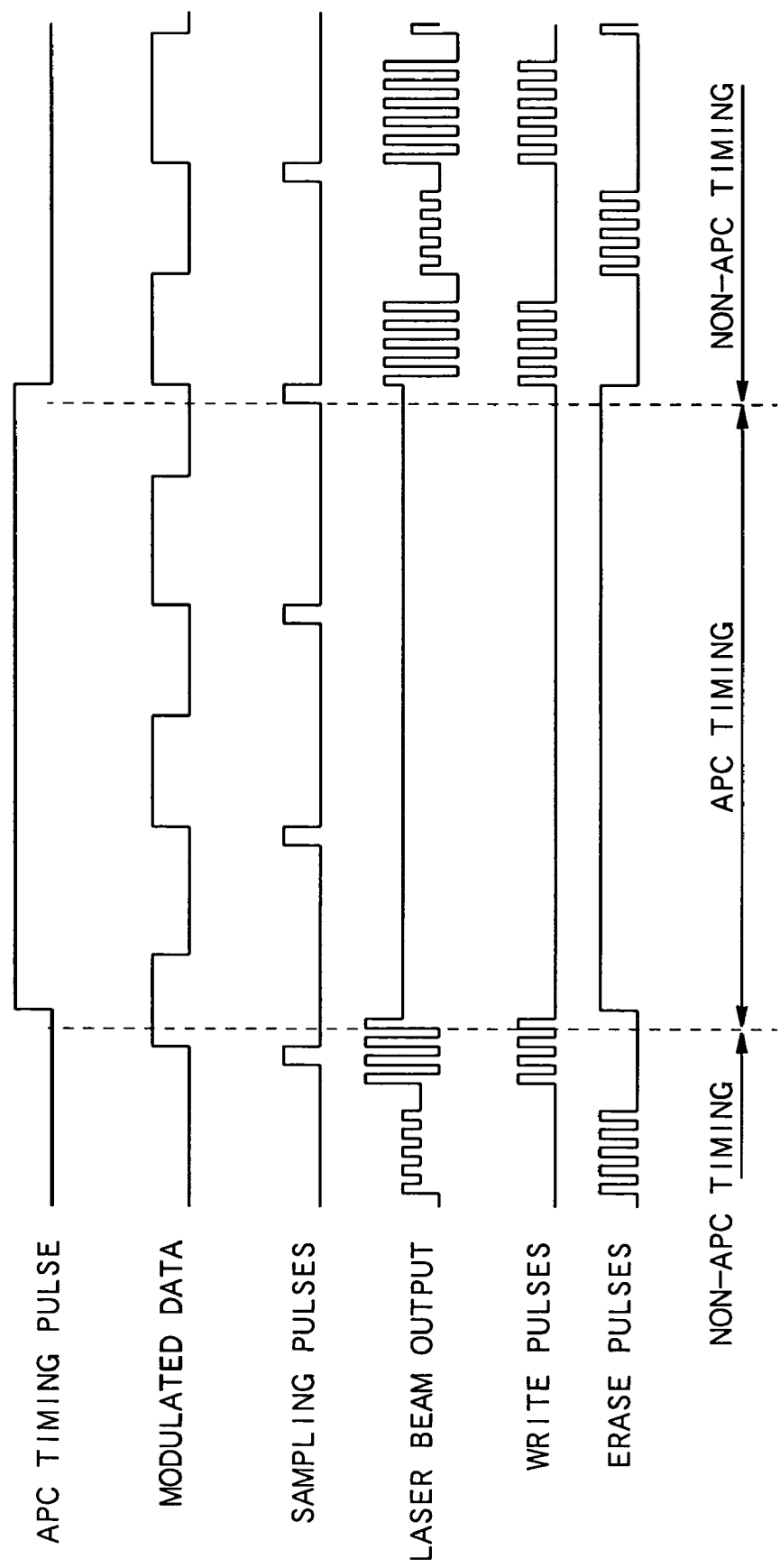
FIG. 12 is a timing chart illustrating a negative feedback control operation according to a third embodiment.
Figure 13:
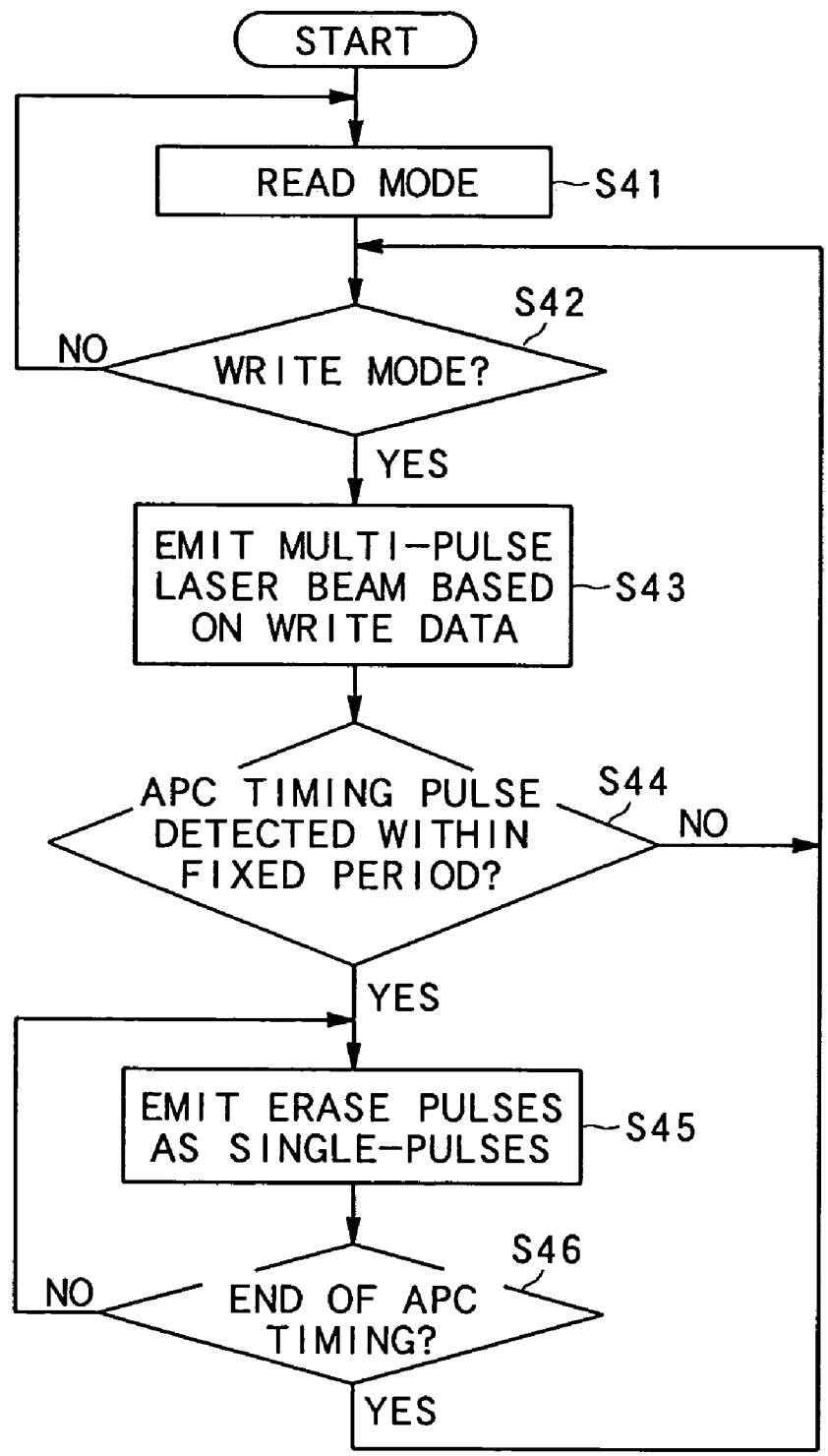
FIG. 13 is a flowchart showing a negative feedback operation (output switching control) according to the third embodiment.

FIG. 12 is a diagram illustrating a negative feedback operation during a data write operation according to this embodiment, and FIG. 13 is a flowchart showing an output switching control operation for the laser beam according to this embodiment.

As shown in FIG. 12, according to this embodiment, the optical pickup apparatus 100 constantly performs the averaging process based on detected detection voltage in write mode in which write data is recorded on an optical disc.

Also, the optical pickup apparatus 100 generates the erase pulses of single-pulse during an APC timing period based on an APC timing pulse and the sampling pulses, adjusts the timing of the sampling pulses, detects the laser beam emitted based on the erase pulses, and thereby performs a sampling process like the one described above.

As suggested earlier, the optical pickup apparatus 100 according to this embodiment sets the APC timing in regular cycles based on control information recorded beforehand in a lead-in area of the optical disc, or sets the APC timing based on pre-address information prestored in the optical disc, and generates the APC timing pulse and the sampling pulses with this timing.

According to this embodiment, a negative feedback control operation is performed by the controller 200 that switches pulse form of the laser beam through an output switching control operation and control current generation control operation.

Next, the output switching control operation according to this embodiment will be described with reference to FIG. 13.

To begin with, by controlling the pulse current generator 180 and semiconductor laser output controller 110, the controller 200 makes the semiconductor laser output controller 110 emit the single-pulse laser beam at the read level to read address information and the like recorded in the lead-in area of the optical disc in advance or to read pre-address information recorded in a data write area of the optical disc if this processing of the controller 200 is performed after the process of Step S42 is performed (Step S41 (read mode)).

At this time, the optical pickup apparatus 100 as a whole reads data from the optical disc by controlling a spindle motor controller for controlling a spindle motor (not shown), a decoder for decoding the read data, etc. and stores the APC timing data, the prerecorded address information, or the like in a memory (not shown).

Next, the controller 200 judges whether or not the optical pickup apparatus 100 is in write mode, based on instructions from a central control processor (not shown) which controls the entire optical pickup apparatus 100 (Step S42).

Specifically, if the optical pickup apparatus 100 is now in read mode, the controller 200 judges whether to switch from read mode to write mode. If the optical pickup apparatus 100 is now in write mode, the controller 200 judges whether or not the optical pickup apparatus 100 has switched from write mode to read mode. If the optical pickup apparatus 100 is already in write mode, the controller 200 judges whether or not it will remain in write mode.

If it is judged that the optical pickup apparatus 100 will remain in read mode or that the optical pickup apparatus 100 will switch from write mode to read mode, the controller 200 performs the process of Step S41, where the controller 200 makes the semiconductor laser output controller 110 emit the laser beam at the read level, by controlling the pulse current generator 180 and semiconductor laser output controller 110.

On the other hand, if it is judged, based on instructions from the central control processor (not shown), that the optical pickup apparatus 100 has switched from read mode to write mode or will remain in write mode, the controller 200 performs the following operations.

First, by controlling the semiconductor laser output controller 110 and the pulse current generator 180, the controller 200 makes the semiconductor laser output controller 110 emit the multi-pulse laser beam based on modulated data (Step S43).

Specifically, by controlling the pulse current generator 180 and the semiconductor laser output controller 110, the controller 200 does the following: if modulated data for forming marks on the optical disc is entered, the controller 200 makes the semiconductor laser output controller 110 emit the write pulses laser beam of multi-pulse to the optical disc in accordance with the modulated data and if modulated data for forming spaces on the optical disc is entered, the controller 200 makes the semiconductor laser output controller 110 emit the erase pulses laser beam of multi-pulse to the optical disc in accordance with the modulated data.

Incidentally, the process of Step S43 is performed during a non-APC timing period. During a non-APC timing period like this, the controller 200 makes the sampling processor 140 generate the control voltage and output the control current by performing subtraction and integration of the sample values being held.

Thus, the second adding unit 190 adds the control current, which is generated by adding the sampled low-frequency control voltage and the averaged high-frequency control voltage and is converted from control voltage, to the currents generated by the pulse current generator 180, and the semiconductor laser output controller 110 controls the light intensity level of the laser beam based on the resulting control currents.

Next, the controller 200 judges whether or not an APC timing pulse generated internally within a fixed period has been detected (Step S44). If no APC timing pulse is detected, the controller 200 performs the process of Step S42.

On the other hand, if the controller 200 detects an APC timing pulse within the fixed period, it outputs the APC timing pulse and the sampling pulses to the sampling processor 140 and the pulse current generator 180. Furthermore, the controller 200 makes the pulse current generator 180 generate the erase pulses of single-pulse during the APC timing period, and makes the semiconductor laser output controller 110 emit the erase pulses of laser beam (Step S45).

Next, the controller 200 judges whether the APC timing period ended, by checking for an APC timing pulse (Step S46). If the APC timing period has not ended yet, the controller 200 performs the process of Step S45. If the APC timing period has ended, the controller 200 performs the process of Step S42.

In the control current generation control according to this embodiment, the laser beam is emitted to the optical disc at the erasing light intensity level for forming spaces in write mode during the APC timing period. Operations of the other components are the same as those of the first embodiment, and thus description thereof will be omitted (see FIG. 8).

In this way, when writing data on an optical disc, this embodiment controls the light intensity of the laser beam emitted from the semiconductor laser output controller 110 and controls the pulse form of the laser beam by switching it.

As described above, according to this embodiment, the optical pickup apparatus 100 comprises: the semiconductor laser output controller 110 for emitting a light beam, of which intensity is modulated, based on write data to be written on an optical disc; the photodetector 120 for detecting at least part of the laser beam emitted from the semiconductor laser output controller 110; the averaging processor 150 for calculating the average value of the detection voltages of the detected laser beam as well as calculates average error between the prestored target average voltage, which is a targeted average value of the detection voltages, and the calculated average value; the sampling processor 140 which acquiring detection voltage of a light beam emitted with a preset timing (during an APC timing period) as a sample value and calculates sampling error between the prestored target sampling voltage and the acquired sample value; and the controller 200 controlling the output intensity level of the laser beam emitted from the semiconductor laser output controller 110, based on the calculated average error and the calculated sampling error.

According to this embodiment with the above configuration, as is the case with the first embodiment, when recording write data on an optical disc by modulating the intensity level of the laser beam outputted from a semiconductor laser, the optical pickup apparatus 100 can easily and independently change intensity levels or irradiation times of the laser-beam and can record the write data without reducing the data recording area on the optical disc.

Furthermore, according to this embodiment, the optical pickup apparatus 100 comprises the HPF 154 which extracts predetermined high-frequency components from the control voltage calculated by the averaging processor 150, and the controller 200 is configured to control the output intensity level of the laser beam emitted from the semiconductor laser output controller 110 based on the extracted high-frequency components and the control voltage calculated through the sampling process.

According to this embodiment with the above configuration, as is the case with the first embodiment, the sampling process allows the optical pickup apparatus 100 to change modulated intensity levels or irradiation times of laser beam easily and independently. Also, when the status of the optical pickup apparatus 100 changes, for example, from read mode to write mode, the optical pickup apparatus 100 can improve switching characteristics (transient characteristics) of the pulse form and light intensity level of the laser beam by adding averaged values.

According to this embodiment, the optical pickup apparatus 100 controls the emission of laser beam when recording write data on an optical disc. However, if the optical pickup apparatus 100 which comprises the photodetector 120 and semiconductor laser circuit is further equipped with computer and a recording medium, a negative feedback control program may be stored on the recording medium and read by the computer to perform negative feedback control in the manner described above.

[Fourth Embodiment]

A fourth embodiment of the optical pickup apparatus will be described with reference to FIG. 14.

The optical pickup apparatus according to this embodiment is characterized in that the detection voltage inputted to the averaging processor is averaged by being filtered through the LPF and then goes through a subtraction process in contract to acquire the average value by performing a subtraction process to the detection voltage inputted to the averaging processor after filtering in the LPF.

In other respects including the negative feedback control, the optical pickup apparatus according to this embodiment is the same as the first embodiment. Thus, components will be denoted by the same reference numerals as the corresponding components of the first embodiment and description thereof will be omitted.

Figure 14:
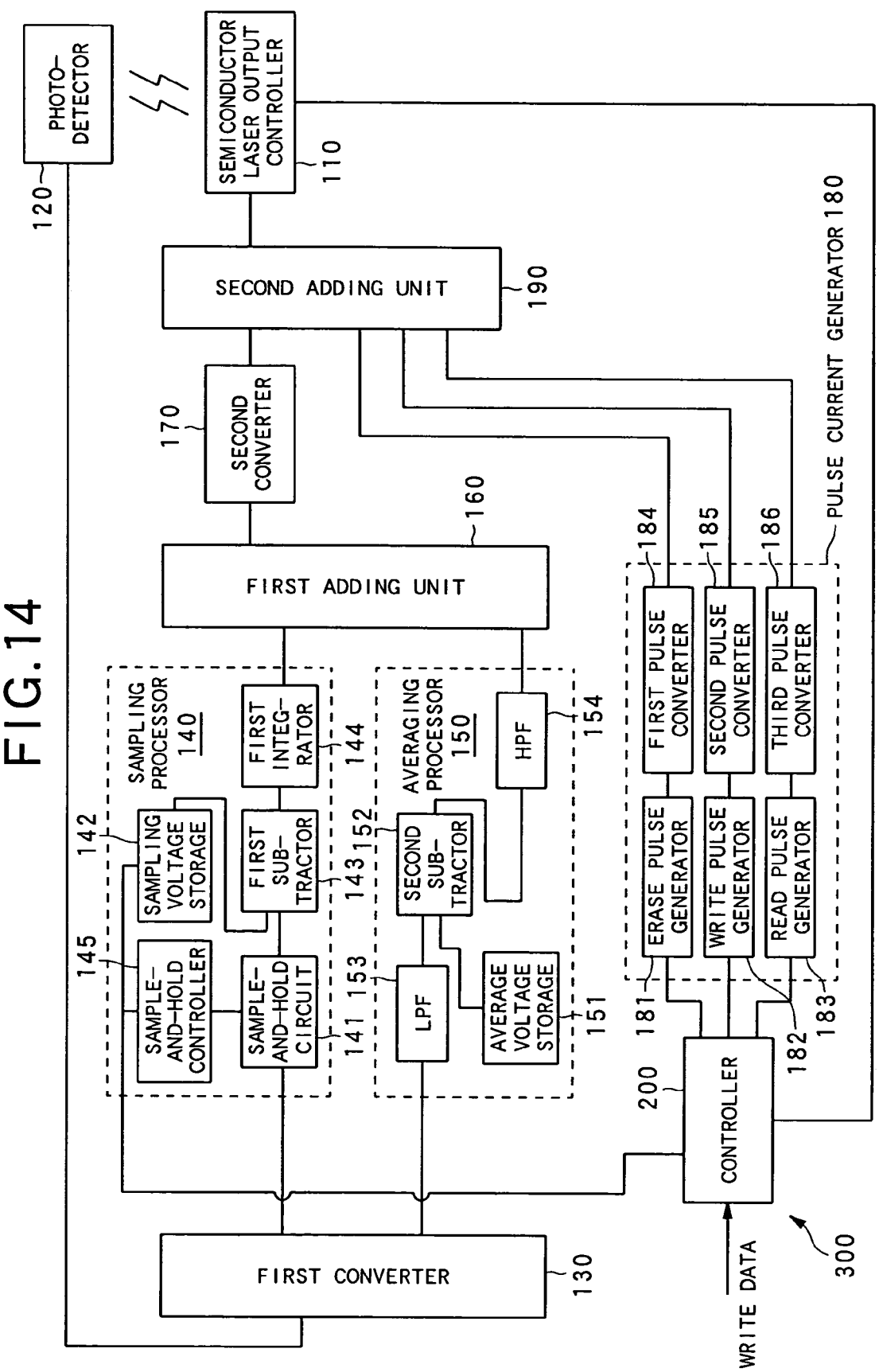
FIG. 14 is a block diagram showing construction of an optical pickup apparatus according to a fourth embodiment.

FIG. 14 is a block diagram showing construction of the optical pickup apparatus according to this embodiment.

The optical pickup apparatus 300 shown in FIG. 14 comprises a semiconductor laser output controller 110, a photodetector 120, a first converter 130, a sampling processor 140, an averaging processor 150, a first adding unit 160, a second converter 170, a pulse current generator 180, a second adding unit 190, and a controller 200.

The averaging processor 150 according to this embodiment consists of an average voltage storage 151, second subtractor 152, LPF 153, and HPF 154.

The average voltage storage 151 prestores the target average write voltage and the target average read voltage and outputs them to the second subtractor 152 by switching between them with the timing specified by the controller 200.

The LPF 153 receives the detection voltage outputted from the first converter 130, extracts low-frequency components from the detection voltage, and outputs the extracted average voltage value to the second subtractor 152.

The second subtractor 152 receives the detection voltage outputted from the LPF 153 and the target values outputted from the average voltage storage 151, subtracts the inputted detection voltage from the inputted target values, and outputs the voltage values (hereinafter referred to as the average error voltage) obtained by the subtraction to the HPF 154.

The HPF 154 receives the average error voltage value outputted from the second subtractor 152, extracts high-frequency components from the average error voltage value, and outputs the result to the second adding unit 190.

As described above, according to this embodiment, the optical pickup apparatus 100 comprises: the semiconductor laser output controller 110 for emitting a light beam, of which intensity is modulated, based on write data to be written on an optical disc; the photodetector 120 for detecting at least part of the laser beam emitted from the semiconductor laser output controller 110; the averaging processor 150 for calculating the average value of the detection voltages of the detected laser beam as well as calculates average error between the prestored target average voltage, which is a targeted average value of the detection voltages, and the calculated average value; the sampling processor 140 for acquiring detection voltage of a light beam emitted with a preset timing (during an APC timing period) as a sample value and calculates sampling error between the prestored target sampling voltage and the acquired sample value; and the controller 200 which controls the output intensity level of the laser beam emitted from the semiconductor laser output controller 110, based on the calculated average error and the calculated sampling error.

According to this embodiment with the above configuration, as is the case with the first embodiment, when recording write data on an optical disc by modulating the intensity level of the laser beam outputted from a semiconductor laser, the optical pickup apparatus 100 can easily and independently change intensity levels or irradiation times of the laser beam and can record the write data without reducing the data recording area on the optical disc.

Furthermore, according to this embodiment, the optical pickup apparatus 100 comprises the HPF 154 which extracts predetermined high-frequency components from the control voltage calculated by the averaging processor 150, and the controller 200 is configured to control the output intensity level of the laser beam emitted from the semiconductor laser output controller 110 based on the extracted high-frequency components and the control voltage calculated through the sampling process.

According to this embodiment with the above configuration, as is the case with the first embodiment, the sampling process allows the optical pickup apparatus 100 to change modulated intensity levels or irradiation times of laser beam easily and independently. Also, when the status of the optical pickup apparatus 100 changes, for example, from read mode to write mode, the optical pickup apparatus 100 can improve switching characteristics (transient characteristics) of the pulse form and light intensity level of the laser beam by adding averaged values.

According to this embodiment, the optical pickup apparatus 100 controls the emission of laser beam when recording write data on an optical disc. However, if the optical pickup apparatus 100 which comprises the photodetector 120 and semiconductor laser circuit is further equipped with computer and a recording medium, a negative feedback control program may be stored on the recording medium and read by the computer to perform negative feedback control in the manner described above.

[Fifth Embodiment]

A fifth embodiment of the optical pickup apparatus will be described with reference to FIG. 15.

The optical pickup apparatus according to this embodiment is characterized in that it uses digital signals for a sampling process, averaging process, and addition process of the sampled and averaged values such as those carried out in the first embodiment. In other respects including the negative feedback control, the optical pickup apparatus according to this embodiment is the same as the first embodiment. Thus, components will be denoted by the same reference numerals as the corresponding components of the first embodiment and description thereof will be omitted.

Figure 15:
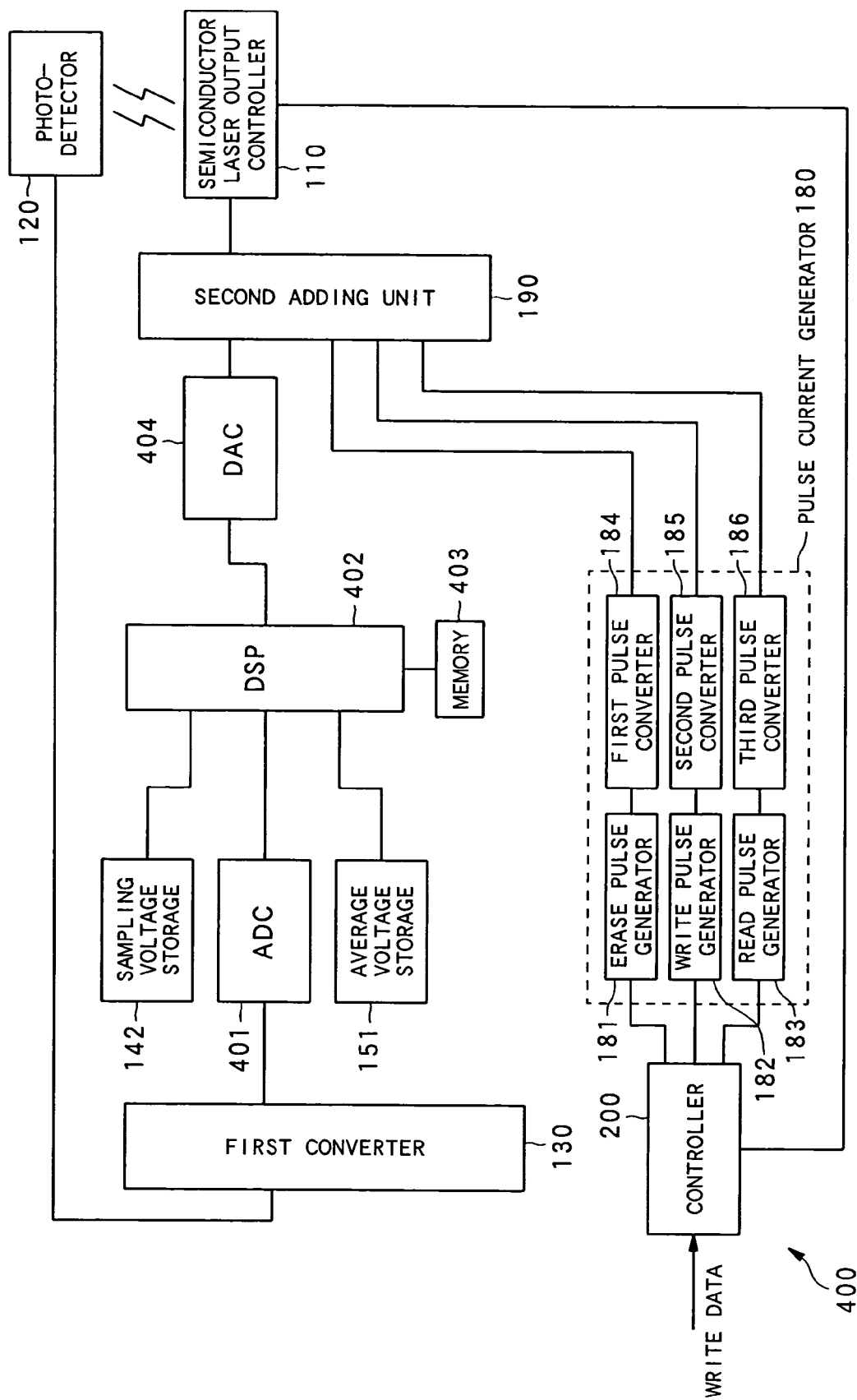
FIG. 15 is a block diagram showing construction of an optical pickup apparatus according to a fifth embodiment.

FIG. 15 is a block diagram showing construction of the optical pickup apparatus according to this embodiment.

The optical pickup apparatus 400 shown in FIG. 15 comprises a semiconductor laser output controller 110, a photodetector 120, a first converter 130, a sampling voltage storage 142, an average voltage storage 151, an analog digital converter (hereinafter referred to as the ADC)401 which converts the detection voltage into digital signals, a DSP (Digital signal Processor) 402 which performs the sampling process, the averaging process, and the addition process of the sampled and the averaged values, a memory 403 which is used when the DSP 402 performs digital processing, a digital analog converter (hereinafter referred to as the DAC)404 which converts digital signals into control current, a pulse current generator 180, a second adding unit 190, and a controller 200.

Incidentally, the sampling voltage storage 142 and the average voltage storage 151 according to this embodiment prestore target voltages as digital values.

The DSP 402 receives the detection voltage converted into digital signals, target sampling voltage outputted from the sampling voltage storage 142, target average voltage outputted from the average voltage storage 151, and then performs a sampling process, averaging process, and addition process, as is the case with the first embodiment, using the memory 403.

Also, the DSP 402 outputs the control voltage of the digital signals which have gone through the sampling process, averaging process, and addition process to the DAC 404.

The DAC 404 converts inputted digital signals into analog signals, converts the control voltage into control current, and outputs the control current to the second adding unit 190.

As described above, according to this embodiment, the optical pickup apparatus 400 comprises: the semiconductor laser output controller 110 for emitting a light beam, of which intensity is modulated, based on write data to be written on an optical disc; the photodetector 120 for detecting at least part of the laser beam emitted from the semiconductor laser output controller 110; DSP 402 for calculating the average value of the detection voltages of the detected laser beam as well as calculates average error between the prestored target average voltage, which is a targeted average value of the detection voltages, and the calculated average value, and for acquiring detection voltage of a light beam emitted with a preset timing (during an APC timing period) as a sample value and calculates sampling error between the prestored target sampling voltage and the acquired sample value; and the controller 200 for controlling the output intensity level of the laser beam emitted from the semiconductor laser output controller 110, based on the calculated average error and the calculated sampling error.

According to this embodiment with the above configuration, as is the case with the first embodiment, when recording write data on an optical disc by modulating the intensity level of the laser beam outputted from a semiconductor laser, the optical pickup apparatus 400 can easily and independently change intensity levels or irradiation times of the laser beam and can record the write data without reducing the data recording area on the optical disc.

Furthermore, according to this embodiment, the optical pickup apparatus 400 comprises DSP 402 which extracts predetermined high-frequency components from the control voltage calculated indicating average error and the controller 200 is configured to control the output intensity level of the laser beam emitted from the semiconductor laser output controller 110 based on the extracted high-frequency components and the control voltage calculated through the sampling process.

According to this embodiment with the above configuration, as is the case with the first embodiment, the sampling process allows the optical pickup apparatus 400 to change modulated intensity levels or irradiation times of laser beam easily and independently. Also, when the status of the optical pickup apparatus 400 changes, for example, from read mode to write mode, the optical pickup apparatus 400 can improve switching characteristics (transient characteristics) of the pulse form and light intensity level of the laser beam by adding averaged values.

The entire disclosure of Japanese Patent Application No. 2003-4827 filed on Jan. 10, 2003 including the specification, claims, drawings and summary is incorporated herein by reference in its entirety.

What is claimed is:

1. A light beam output control apparatus comprising:
   an emission device which emits a light beam;
   a detection device which detects at least part of the light beam emitted from the emission device;
   an acquisition device which acquires, as a sampling value, the light intensity level of the detected light beam emitted with a predetermined timing;
   a first storage device which prestores a value made into a target at a average value at the intensity level of the detected light beam as a target average value;
   a second storage device which stores a sampling value made into a target at the intensity level of the light beam acquired as the sampling value, as a target sampling value;
   a first error calculation device which calculates average error between the average value at the intensity level of the detected light beam and the target average value based on the light intensity level of the detected light beam and the stored target average value;
   a second error calculation device which calculates sampling error between the stored target sampling value and the acquired sampling value; and
   a control device which controls the output intensity level of the light beam emitted from said emission device, based on the calculated average error and the calculated sampling error.

2. The light beam output control apparatus according to claim 1, further comprising:
   an extraction device which extracts an average error component which represents a predetermined component contained in the average error calculated by said first error calculation device,
   wherein said control device controls the output intensity level of the light beam emitted from said emission device based on the extracted average error component and the sampling error calculated by said second error calculation device.

3. The light beam output control apparatus according to claim 1, further comprising:
   a timing setting device which presets the timing for acquiring the sampling value of the light beam emitted from said emission device,
   wherein said acquisition device acquires, as the sampling value, the light intensity level of the light beam emitted with the preset timing and detected by said detection device.

4. An optical pickup apparatus which emits a light beam to an optical recording medium to record data on the optical recording medium, comprising:
   an emission device which emits a light beam, of which intensity is modulated, to the optical recording medium based on data to be recorded on the optical recording medium;
   a detection device which detects at least part of the light beam emitted from said emission device;
   an acquisition device which acquires, as a sampling value, the light intensity level of the detected light beam emitted with a predetermined timing;
   a first storage device which prestores a value made into a target at a average value at the intensity level of the detected light beam as a target average value;
   a second storage device which stores a sampling value made into a target at the intensity level of the light beam acquired as the sampling value, as a target sampling value;
   a first error calculation device which calculates average error between the average value at the intensity level of the detected light beam and the target average value based on the light intensity level of the detected light beam and the stored target average value;
   a second error calculation device which calculates sampling error between the stored target sampling value and the acquired sampling value; and
   a control device which controls the output intensity level of the light beam emitted from said emission device, based on the calculated average error and the calculated sampling error.

5. The optical pickup apparatus according to claim 4, further comprising
   an extraction device which extracts an average error component which represents a predetermined component contained in the average error calculated by said first error calculation device,
   wherein said control device controls the output intensity level of the light beam emitted from said emission device based on the extracted average error component and the sampling error calculated by said second error calculation device.

6. The optical pickup apparatus according to claim 4, further comprising
   a timing setting device which presets the timing for acquiring the sampling value of the light beam emitted from said emission device,
   wherein said acquisition device acquires, as the sampling value, the light intensity level of the light beam emitted with the preset timing and detected by said detection device.

7. The optical pickup apparatus according to claim 4, in the case where timing information which indicates the timing for acquiring the sampling value of the light beam emitted from the emission device is prestored on an optical recording medium and is read out in advance, further comprising
   a timing setting device which presets the timing for acquiring the sampling value of the light beam emitted from said emission device, based on the timing information read out in advance; and
   wherein said acquisition device acquires, as the sampling value, the light intensity level of the light beam emitted with the timing and detected by said detection device.

8. The optical pickup apparatus according to claim 6, in the case where a plurality of sampling values is acquired; wherein
   said acquisition device acquires, as the sampling values, the light intensity levels of the light beam emitted in regular cycles and detected by said detection device.

9. The optical pickup apparatus according to claim 4, in the case where said emission device emits the light beam to the optical recording medium at least by switching the intensity of the light beam emitted from said emission device, depending on whether the optical pickup apparatus is in record mode in which the data is recorded on the optical recording medium or read mode in which the data is read out of the optical recording medium, and the acquisition device acquires the sampling value, wherein:
   said control device makes said emission device output the light beam at the intensity level at least one of processing when reading data from the optical recording medium, when writing data on the optical recording medium, and when recording data on the optical recording medium is erased.

10. The optical pickup apparatus according to claim 4, in the case where the data is recorded on the optical recording medium by using multiple kinds of different partial data, the light beam, of which intensity is modulated, based on each kind of partial data, and the data is recorded on the optical recording medium, wherein;

said emission device emits a light beam to the optical recording medium by switching between a multi-pulse beam for recording one item of the partial data using a plurality of pulsed lights and a single-pulse beam for recording one item of the partial data using one pulsed light; and said control device makes the light beam said emission device emit as the single-pulse beam with the preset timing with which said acquisition device acquires the sampling value.

11. A light beam emission control method comprising:

an emission process of emitting a light beam from an emission device;

a detection process of detecting at least part of the light beam emitted from said emission device;

an acquisition process of acquiring, as a sampling value, the light intensity level of the detected light beam emitted with a predetermined timing;

a first error calculation process of calculating average error between a average value at the intensity level of the detected light beam and a prestoring a value made into a target at a average value at the intensity level of the detected light beam as a target average value, based on the light intensity level of the detected light beam and the target average value; and a second error calculation process of calculating sampling error between a stored sampling value made into a target at the intensity level of the light beam acquired as the sampling value, as a target sampling value, and the acquired sampling value in acquisition process, wherein the light beam from said emission device is emitted in said emission process, based on the calculated average error and the calculated sampling error.

12. The light beam emission control method according to claim 11, further comprising an extraction process of extracting an average error component which represents a predetermined component contained in the average error calculated in said first error calculation process, wherein the light beam from said emission device (110) is emitted in said emission process, based on the extracted average error component and the calculated sampling error in said second error calculation process.

13. The light beam emission control method according to claim 11, further comprising a timing setting process which presets the timing for acquiring the sampling value of the light beam emitted from said emission device, wherein the light intensity level of the light beam is emitted in said acquisition process, as the sampling value, with the preset timing and detected.

14. A recording medium wherein a light beam emission control program is recorded so as to be read by a computer, the computer included in a light beam control device, said program causing the computer to function as:

an emission control device which controls the emission of a light beam from an emission device;

a detection device which detects at least part of the light beam emitted from said emission device;

an acquisition device which acquires, as a sampling value, the light intensity level of the detected light beam emitted with a predetermined timing;

a first error calculation device which calculates average error between a average value at the intensity level of the detected light beam and a prestoring a value made into a target at a average value at the intensity level of the detected light beam as a target average value, based on the light intensity level of the detected light beam and the target average value; and a second error calculation device which calculates sampling error between a stored sampling value made into a target at the intensity level of the light beam acquired as the sampling value, as a target sampling value, and the acquired sampling value, wherein said emission control device which controls the emission of the light beam from said emission device, based on the calculated average error and the calculated sampling error.

15. The recording medium according to claim 14, wherein the program further causes the computer to function as an extraction device which extracts an average error component which represents a predetermined component contained in the average error calculated, wherein said control device controls the output intensity level of the light beam emitted from said emission device based on the extracted average error component and the sampling error calculated.

16. The recording medium according to claim 14, wherein the program further causes the computer to function as a timing setting device which presets the timing for acquiring the sampling value of the light beam emitted from said emission device, wherein said acquisition device acquires, as the sampling value, the light intensity level of the light beam emitted with the preset timing and detected.

* * * * *